US012596698B1

(12) United States Patent
Gong et al.

(10) Patent No.: US 12,596,698 B1
(45) Date of Patent: Apr. 7, 2026

(54) SYSTEMS AND METHODS FOR COMPUTER-IMPLEMENTED INGESTION AND SCHEMA-GOVERNED VALIDATION OF STRUCTURED DATA FILES USING EXECUTABLE METADATA TOKENS

(71) Applicant: SAS Institute Inc., Cary, NC (US)

(72) Inventors: Qing Gong, Cary, NC (US); Murilo Machado Brizzotti, Cary, NC (US); Kimberly W. Lewis, Morehead City, NC (US); Samuel Duemler, Raleigh, NC (US); Joshua Rony, Pleasant Hill, CA (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 19/244,592

(22) Filed: Jun. 20, 2025

Related U.S. Application Data

(60) Provisional application No. 63/727,093, filed on Dec. 2, 2024.

(51) Int. Cl.
*G06F 16/00* (2019.01)
*G06F 16/21* (2019.01)
*G06F 16/22* (2019.01)

(52) U.S. Cl.
CPC ........ *G06F 16/2282* (2019.01); *G06F 16/211* (2019.01)

(58) Field of Classification Search
CPC .... G06F 16/2358; G06F 16/213; G06F 16/23; G06F 16/235; G06F 16/25; G06F 16/254; G06F 16/275; G06F 16/951; G06F 3/067; G06F 16/41; G06F 16/122; G06F 3/064; G06F 3/06; G06F 3/061; H04L 67/02; H04L 67/06; H04L 67/56; H04L 69/08
See application file for complete search history.

(56) References Cited

U.S. PATENT DOCUMENTS

2020/0142868 A1* 5/2020 Varadarajan .......... G06F 16/278
2021/0011891 A1* 1/2021 Soza ....................... G06F 16/23

* cited by examiner

*Primary Examiner* — Shyue Jiunn Hwa
(74) *Attorney, Agent, or Firm* — Padowithz Alce; Quintin Scheitlin; Alce PLLC

(57) ABSTRACT
A system, method, and computer-program product include receiving, via an API server, an upload request that includes a logical table reference parameter and a structured data file. A table metadata schema corresponding to the logical table reference parameter is retrieved from a metadata repository. A plurality of data entries of the structured data file are converted into schema-conforming data records using column metadata definitions extracted from the schema. The conversion includes identifying source column headers matching source column identifiers, parsing associated cell value sets, validating the cell value sets based on criteria defined in the metadata definitions, and associating validated values with database columns. The schema-conforming data records are persisted to a database table designated in the table metadata schema.

30 Claims, 23 Drawing Sheets

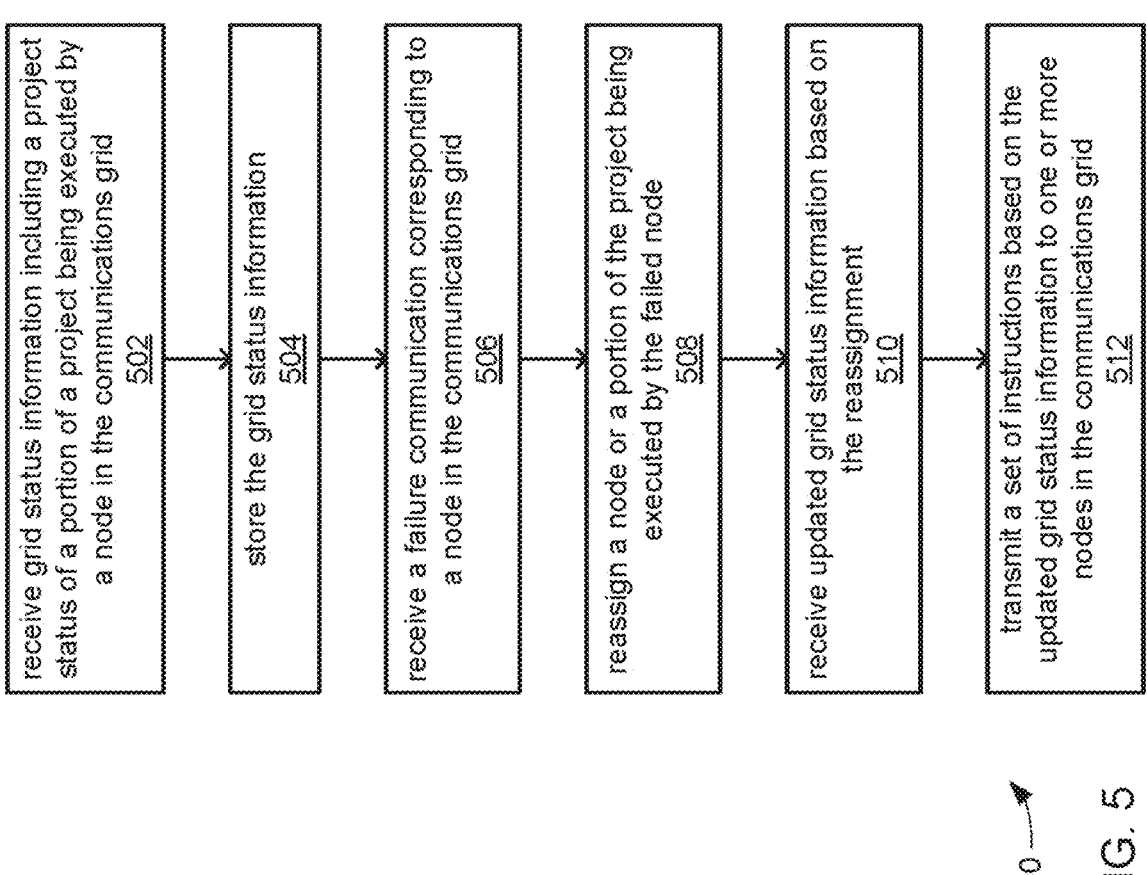

receive grid status information including a project status of a portion of a project being executed by a node in the communications grid
502 store the grid status information
504 receive a failure communication corresponding to a node in the communications grid
506 reassign a node or a portion of the project being executed by the failed node
508 receive updated grid status information based on the reassignment
510 transmit a set of instructions based on the updated grid status information to one or more nodes in the communications grid
512

900 instantive event stream processing engine
900 create engine container
902 instantiate continuous queries
904 initialize publish/subscribe capability
906 start projects
908 receive event block
910 process event block
912 output processed event block
914 stop processing?
916 yes no stop projects
918 shutdown
920 receive training data 1102 train machine-learning model using training data 1104 evaluate machine-learning model 1106 adequate accuracy? 1108 no yes receive new data 1110 analyze new data using trained machine-learning model 1112 post-processing on result 1114

1100

1300

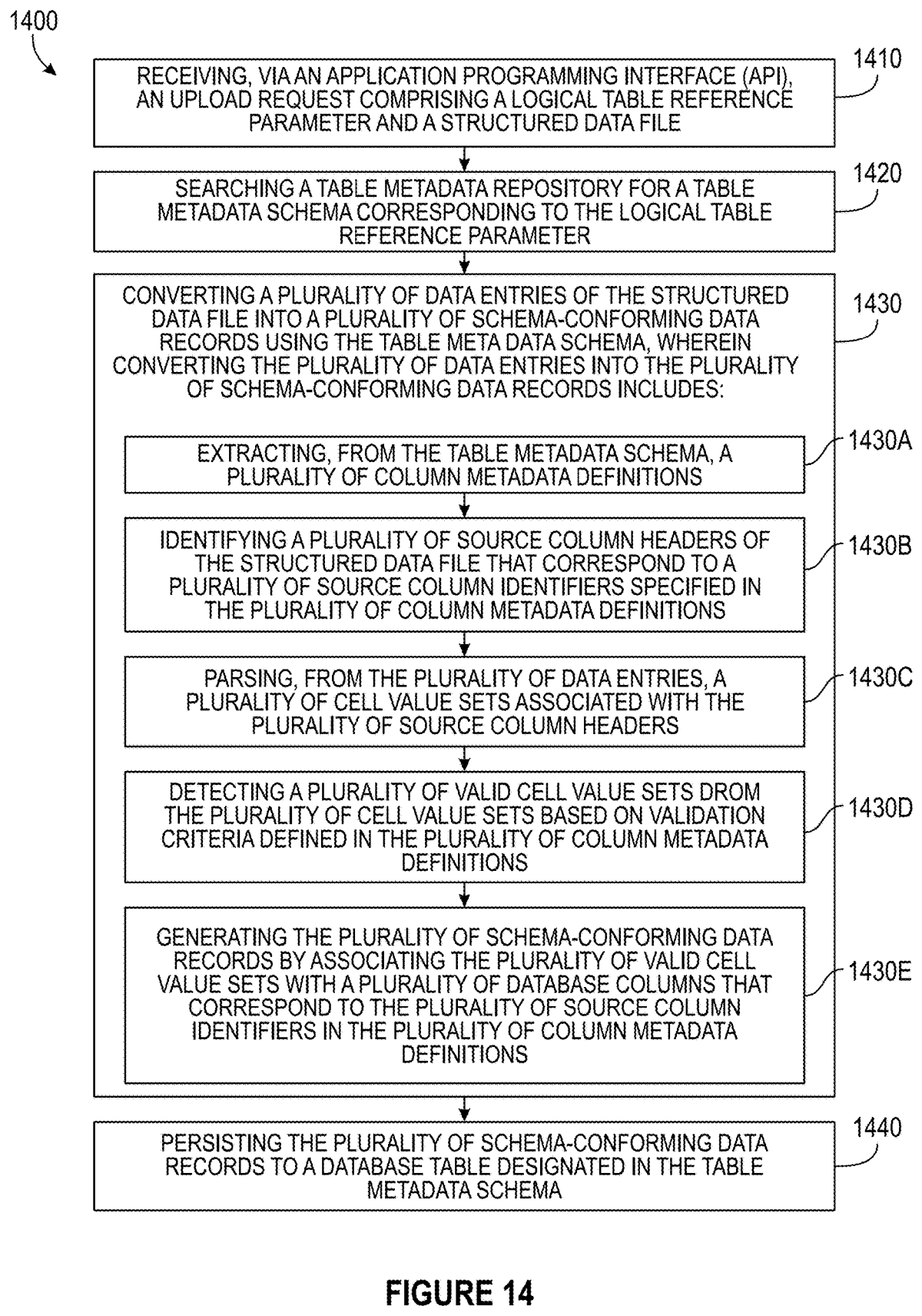

1400

| 1410 |
|---|
| RECEIVING, VIA AN APPLICATION PROGRAMMING INTERFACE (API), AN UPLOAD REQUEST COMPRISING A LOGICAL TABLE REFERENCE PARAMETER AND A STRUCTURED DATA FILE |

1420

SEARCHING A TABLE METADATA REPOSITORY FOR A TABLE METADATA SCHEMA CORRESPONDING TO THE LOGICAL TABLE REFERENCE PARAMETER

1430

CONVERTING A PLURALITY OF DATA ENTRIES OF THE STRUCTURED DATA FILE INTO A PLURALITY OF SCHEMA-CONFORMING DATA RECORDS USING THE TABLE META DATA SCHEMA, WHEREIN CONVERTING THE PLURALITY OF DATA ENTRIES INTO THE PLURALITY OF SCHEMA-CONFORMING DATA RECORDS INCLUDES:

1430A

EXTRACTING, FROM THE TABLE METADATA SCHEMA, A PLURALITY OF COLUMN METADATA DEFINITIONS

1430B

IDENTIFYING A PLURALITY OF SOURCE COLUMN HEADERS OF THE STRUCTURED DATA FILE THAT CORRESPOND TO A PLURALITY OF SOURCE COLUMN IDENTIFIERS SPECIFIED IN THE PLURALITY OF COLUMN METADATA DEFINITIONS

1430C

PARSING, FROM THE PLURALITY OF DATA ENTRIES, A PLURALITY OF CELL VALUE SETS ASSOCIATED WITH THE PLURALITY OF SOURCE COLUMN HEADERS

1430D

DETECTING A PLURALITY OF VALID CELL VALUE SETS DROM THE PLURALITY OF CELL VALUE SETS BASED ON VALIDATION CRITERIA DEFINED IN THE PLURALITY OF COLUMN METADATA DEFINITIONS

1430E

GENERATING THE PLURALITY OF SCHEMA-CONFORMING DATA RECORDS BY ASSOCIATING THE PLURALITY OF VALID CELL VALUE SETS WITH A PLURALITY OF DATABASE COLUMNS THAT CORRESPOND TO THE PLURALITY OF SOURCE COLUMN IDENTIFIERS IN THE PLURALITY OF COLUMN METADATA DEFINITIONS

1440

PERSISTING THE PLURALITY OF SCHEMA-CONFORMING DATA RECORDS TO A DATABASE TABLE DESIGNATED IN THE TABLE METADATA SCHEMA

FIGURE 14

| Components    1512 | Upload Request    1504 |
|---|---|
| HTTP Method 1512A | POST   1513 |
| Endpoint  1512B | /riskMarket/tabledata?tableType=PD_DATA  1506 |
| Request Body (Payload) 1512C | Structured Data File 1508 |
| Response 1512D | Indication of upload status (success/failure) |

1514

Figure 15D:
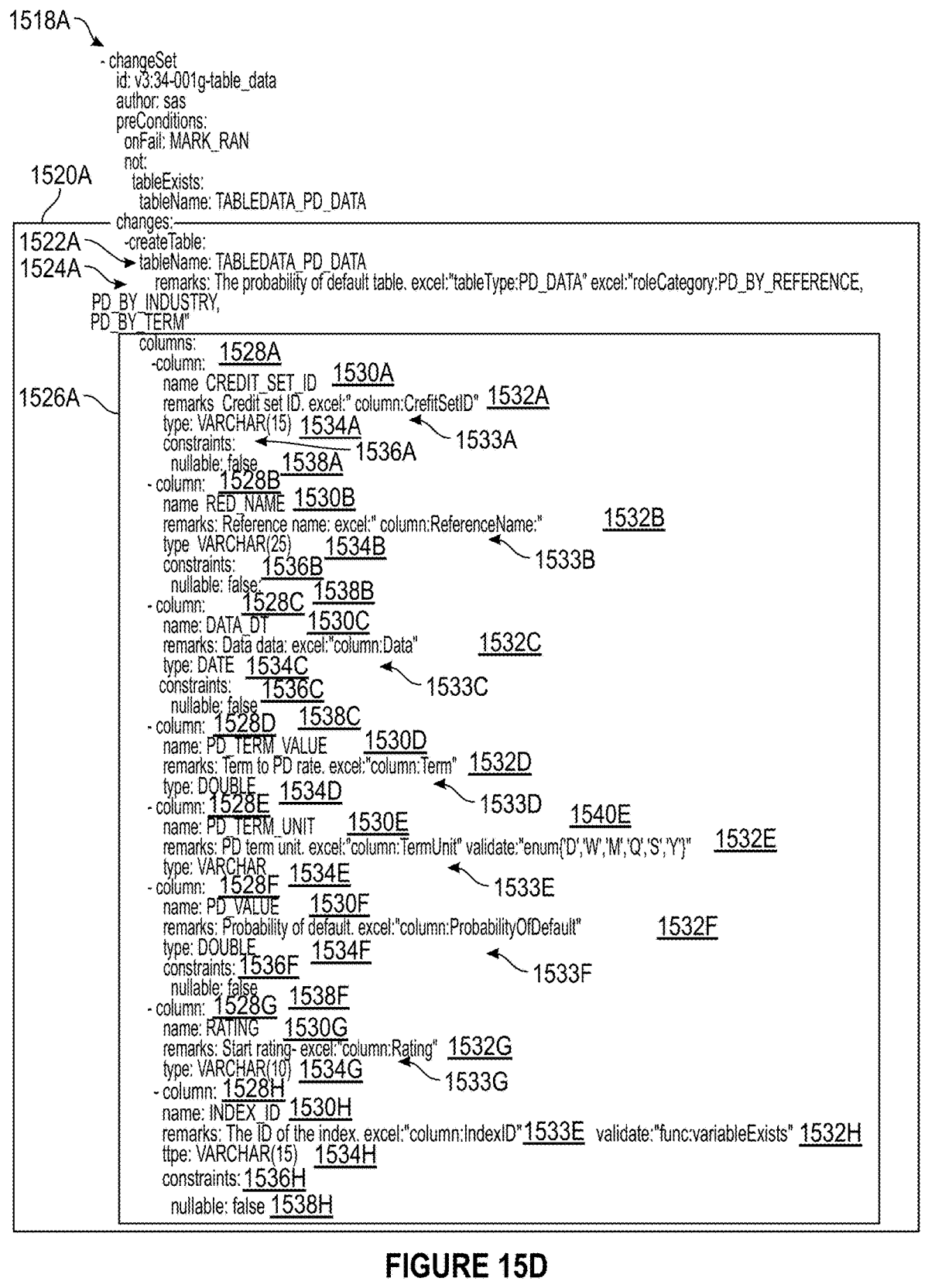

1518A

```
- changeSet
    id: v3:34-001g-table_data
    author: sas
    preConditions:
      onFail: MARK_RAN
      not:
        tableExists:
          tableName: TABLEDATA_PD_DATA
    changes:
      -createTable:
          tableName: TABLEDATA_PD_DATA
          remarks: The probability of default table. excel:"tableType:PD_DATA" excel:"roleCategory:PD_BY_REFERENCE,
PD_BY_INDUSTRY,
PD_BY_TERM"
          columns:
            -column:
              name: CREDIT_SET_ID
              remarks: Credit set ID. excel:" column:CrefitSetID"
              type: VARCHAR(15)
              constraints:
                nullable: false
            - column:
              name: RED_NAME
              remarks: Reference name: excel:" column:ReferenceName:"
              type: VARCHAR(25)
              constraints:
                nullable: false
            - column:
              name: DATA_DT
              remarks: Data data: excel:"column:Data"
              type: DATE
              constraints:
                nullable: false
            - column:
              name: PD_TERM_VALUE
              remarks: Term to PD rate. excel:"column:Term"
              type: DOUBLE
            - column:
              name: PD_TERM_UNIT
              remarks: PD term unit. excel:"column:TermUnit" validate:"enum{'D','W','M','Q','S','Y'}"
              type: VARCHAR
            - column:
              name: PD_VALUE
              remarks: Probability of default. excel:"column:ProbabilityOfDefault"
              type: DOUBLE
              constraints:
                nullable: false
            - column:
              name: RATING
              remarks: Start rating- excel:"column:Rating"
              type: VARCHAR(10)
            - column:
              name: INDEX_ID
              remarks: The ID of the index. excel:"column:IndexID" validate:"func:variableExists"
              ttpe: VARCHAR(15)
              constraints:
                nullable: false
```

Figure 15E:
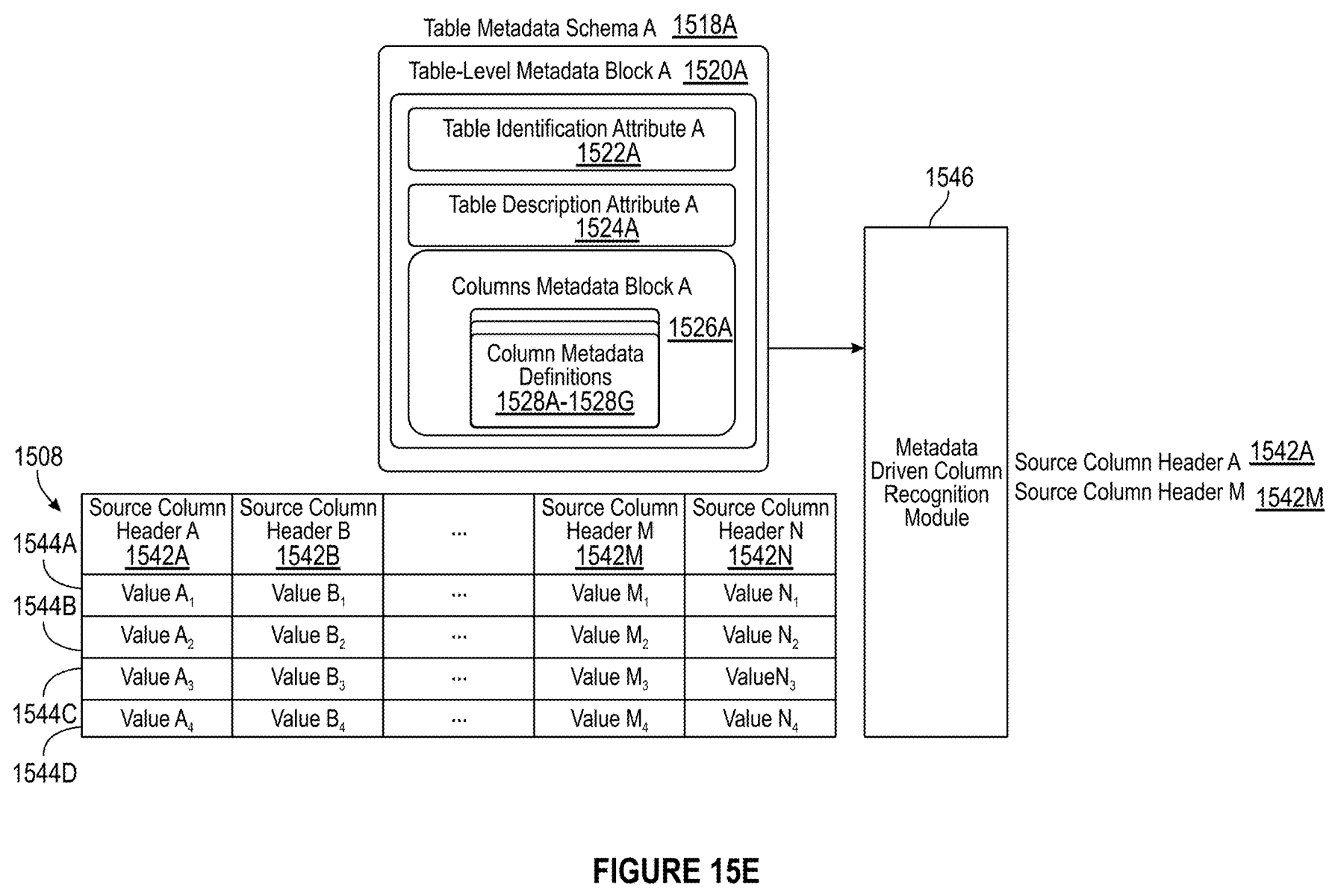

Table Metadata Schema A   1518A

Table-Level Metadata Block A   1520A

Table Identification Attribute A
1522A

Table Description Attribute A
1524A

Columns Metadata Block A   1526A

Column Metadata
Definitions
1528A–1528G

1546

Metadata
Driven Column
Recognition
Module

Source Column Header A   1542A
Source Column Header M   1542M

| | Source Column Header A 1542A | Source Column Header B 1542B | ... | Source Column Header M 1542M | Source Column Header N 1542N |
|---|---|---|---|---|---|
| 1544A | Value $A_1$ | Value $B_1$ | ... | Value $M_1$ | Value $N_1$ |
| 1544B | Value $A_2$ | Value $B_2$ | ... | Value $M_2$ | Value $N_2$ |
| | Value $A_3$ | Value $B_3$ | ... | Value $M_3$ | Value $N_3$ |
| 1544C | Value $A_4$ | Value $B_4$ | ... | Value $M_4$ | Value $N_4$ |

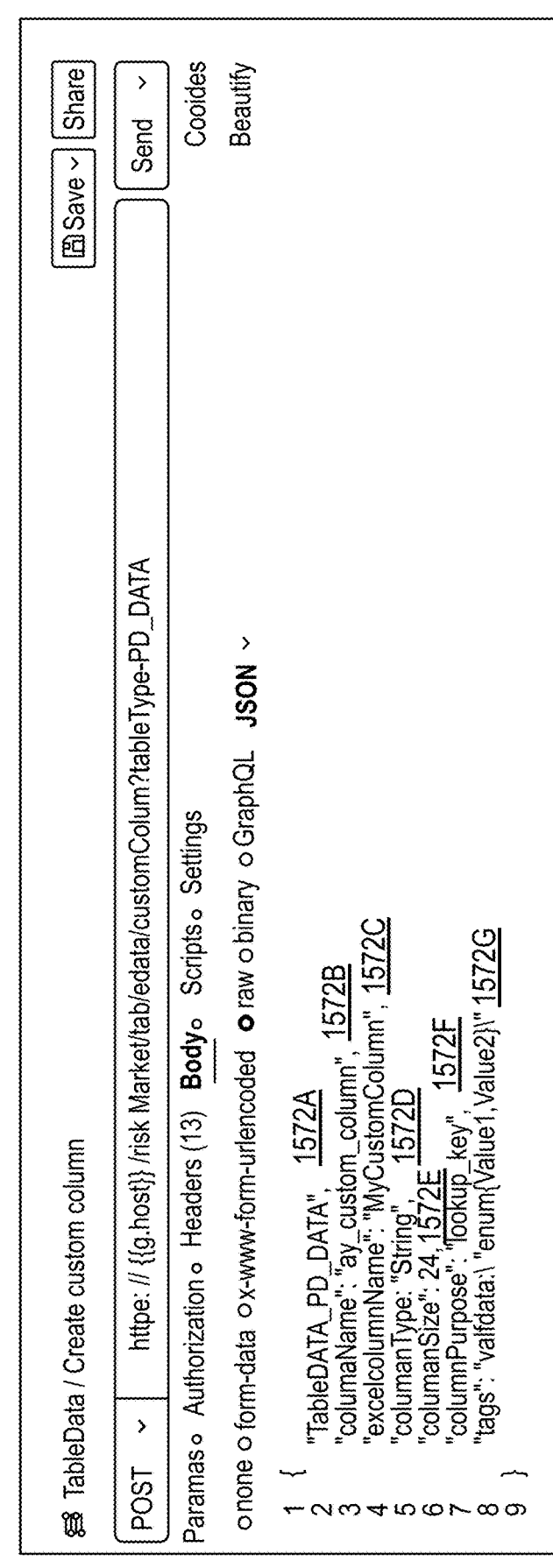

📇 TableData / Create custom column

☐Save ⌄   Share

| POST ⌄ | httpe: // {{g.host}} /risk Market/tab/edata/customColum?tableType-PD_DATA | Send ⌄ |

Cooides

Paramas ○ Authorization ○ Headers (13) Body ○ Scripts ○ Settings

Beautify

○none ○ form-data ○x-www-form-urlencoded O raw ○ binary ○ GraphQL   JSON ⌄

```
1  {
2    "TableDATA_PD_DATA",  1572A
3    "columaName": "ay_custom_column",  1572B
4    "excelcolumnName": "MyCustomColumn", 1572C
5    "columanType: "String",  1572D
6    "columanSize": 24, 1572E
7    "columnPurpose": "lookup  key",  1572F
8    "tags": "valfdata:\ "enum{Value1,Value2}\" 1572G
9  }
```

FIGURE 15L

SYSTEMS AND METHODS FOR COMPUTER-IMPLEMENTED INGESTION AND SCHEMA-GOVERNED VALIDATION OF STRUCTURED DATA FILES USING EXECUTABLE METADATA TOKENS

CROSS-REFERENCE TO RELATED APPLICATIONS

This application claims the benefit of U.S. Provisional Application No. 63/727,093, filed 2 Dec. 2024, which is incorporated in its entirety by this reference.

TECHNICAL FIELD

The embodiments of the present application relate generally to the field of structured data processing and schema governance, and more specifically, to new and useful systems and methods for ingesting, validating, transforming, querying, and exporting tabular data using metadata-driven schemas, executable column-level metadata, and configurable runtime functions in a computing environment.

BACKGROUND

In traditional data ingestion and validation systems, structured data files are processed using static schemas and hardcoded validation logic. Column mappings, data constraints, and value enumerations are often implemented directly in source code or manually configured in flat files. This approach requires extensive upfront schema definition, repeated coding for each new data format, and manual updating whenever source systems change. These rigid architectures limit reusability, reduce adaptability across heterogeneous datasets, and increase operational overhead in managing evolving data pipelines.

Therefore, there is a need in the art for systems and methods that enable schema-driven ingestion, transformation, and validation of structured data using metadata definitions that are interpretable at runtime. There is also a need for configurable metadata that can invoke reusable validation logic by referencing function identifiers and external data sources, thereby enabling centralized management of validation rules and dynamic extension of schema capabilities. The embodiments of the present application provide technical solutions that address, at least, the needs described above, as well as the deficiencies of the state of the art.

BRIEF SUMMARY OF THE EMBODIMENT(S)

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

In one embodiment, a computer-program product comprises a non-transitory machine-readable storage medium storing computer instructions that, when executed by one or more processors, perform operations including: receiving, via an application programming interface (API) server, an upload request comprising a logical table reference parameter and a structured data file; searching a table metadata repository for a table metadata schema corresponding to the logical table reference parameter; converting a plurality of data entries of the structured data file into a plurality of schema-conforming data records using the table metadata schema by performing column matching and validation; and persisting the schema-conforming data records to a database table designated in the table metadata schema.

In one embodiment, the table metadata schema includes a table-level metadata block comprising a table identification attribute that specifies the database table and a table description attribute that includes metadata describing the logical table reference parameter.

In one embodiment, searching the table metadata repository includes detecting that a respective table metadata schema includes a table description attribute matching the logical table reference parameter and using the detected schema as the corresponding table metadata schema.

In one embodiment, each column metadata definition includes a column identification attribute, a column description attribute comprising a source column identifier and associated validation criteria, a column type attribute specifying data type, and a constraints attribute defining additional validation criteria.

In one embodiment, identifying source column headers includes detecting headers in the structured data file and mapping them to column metadata definitions based on matching source column identifiers.

In one embodiment, the upload request specifies a URL endpoint comprising the logical table reference parameter as a query parameter and a payload comprising the structured data file.

In one embodiment, the logical table reference parameter functions as an alias for the target database table, and each source column identifier serves as an alias for the corresponding database column.

In one embodiment, the validation criteria specify rules for a first source column header, and a value is detected as valid when it satisfies the criteria.

In one embodiment, a value corresponding to a second source column header that fails its validation criteria will disqualify the associated cell value set from inclusion, even if other values in the set pass.

In one embodiment, the validation criteria may include constraints such as data type, minimum or maximum values, required field indicators, and enumerated value lists.

In one embodiment, each data entry includes multiple cell values associated with source column headers, and each cell value set is constructed based on those values.

In one embodiment, parsing data entries includes generating cell value sets for each row of the structured data file, associating values with their corresponding headers.

In one embodiment, schema-conforming data records are generated by identifying corresponding column metadata definitions and associating validated values with database columns.

In one embodiment, the system may respond to a query request by filtering and returning schema-conforming data records based on a logical table reference parameter and filter parameter.

In one embodiment, the system reconstructs the filter parameter into a database-compatible condition via metadata reflection, executes a database query, and returns matching data records.

In one embodiment, the query request specifies a URL endpoint that includes the filter parameter and logical table reference as query parameters.

In one embodiment, the system may support column creation requests via the API server, including updating the database table and the table metadata schema with a new column metadata definition.

In one embodiment, the column creation request specifies a name for the new database column, and the new column metadata definition includes a corresponding column identification attribute.

In one embodiment, the column creation request specifies a source column identifier, which is included in the new column metadata definition as a column description attribute.

In one embodiment, the column creation request specifies a data type and data size for the new database column, which are encoded into a column type attribute.

In one embodiment, a textual description is provided for the new database column and encoded in the column description attribute of the new column metadata definition.

In one embodiment, the column creation request includes a validation criterion, which is included in the column description attribute of the new column metadata definition.

In one embodiment, the column creation request specifies whether the new database column requires a value, which is encoded in the new column metadata definition.

In one embodiment, after persisting the schema-conforming data records, the system may generate and transmit a real-time response indicating successful upload.

In one embodiment, upon successful upload, the system may broadcast a real-time message to subscribed software applications indicating new data availability.

In one embodiment, the broadcast message may include a notification with a data summary, link for access, or alert for required user action.

In one embodiment, the structured data file includes non-conforming data entries, and the system automatically converts the data into schema-conforming records.

In one embodiment, the API server executes the search, conversion, and persistence operations as part of a unified set of computer-executable functions.

In one embodiment, the system reuses the same functions for subsequent upload requests involving different logical table references and structured data files.

In one embodiment, the system supports data export requests and returns a structured data file based on converting stored schema-conforming data records back into their original format using metadata schema reflection.

BRIEF DESCRIPTION OF THE FIGURES

FIG. 5 illustrates a flow chart showing an example process for adjusting a communications grid or a work project in a communications grid after a failure of a node, according to some embodiments of the present technology;

FIG. 14 illustrates a flowchart showing an example process for ingesting, validating, and transforming a structured data file using a metadata-driven schema, according to some embodiments of the present technology;

FIG. 15D illustrates an example column metadata definition comprising a column identification attribute, column description attribute, column type attribute, and constraints attribute, according to some embodiments of the present technology;

FIG. 15E illustrates an example process for identifying a plurality of source column headers from a structured data file and mapping the headers to source column identifiers defined in the column metadata definitions, according to some embodiments of the present technology;

FIG. 15L illustrates an example process for broadcasting a real-time message to subscribed applications in response to persisting schema-conforming data records, according to some embodiments of the present technology, and for generating a structured data file in response to a data export request based on converting schema-conforming data records back into a structured format using metadata schema reflection, according to some embodiments of the present technology.

DESCRIPTION OF THE PREFERRED EMBODIMENTS

The following description of the preferred embodiments of the present application is not intended to limit the present application to these preferred embodiments, but rather to enable any person skilled in the art to make and use the embodiments of the present application.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional operations not included in a figure. A process may correspond to a method, a function, a procedure, a subroutine, a subprogram, etc. When a process corresponds to a function, its termination can correspond to a return of the function to the calling function or the main function.

Example Systems

Systems depicted in some of the figures may be provided in various configurations. In some embodiments, the systems may be configured as a distributed system where one or more components of the system are distributed across one or more networks in a cloud computing system.

Figure 1:
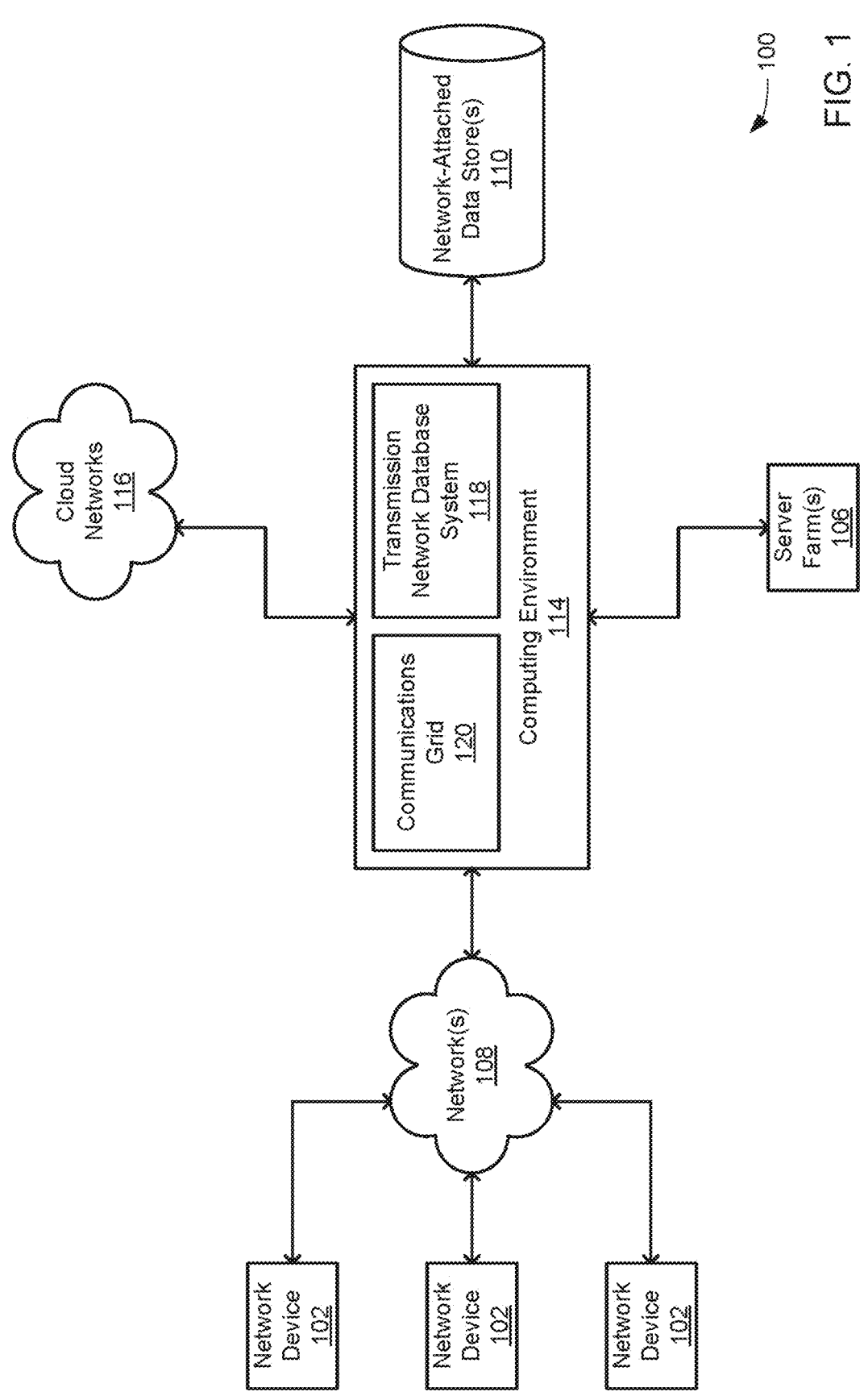
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
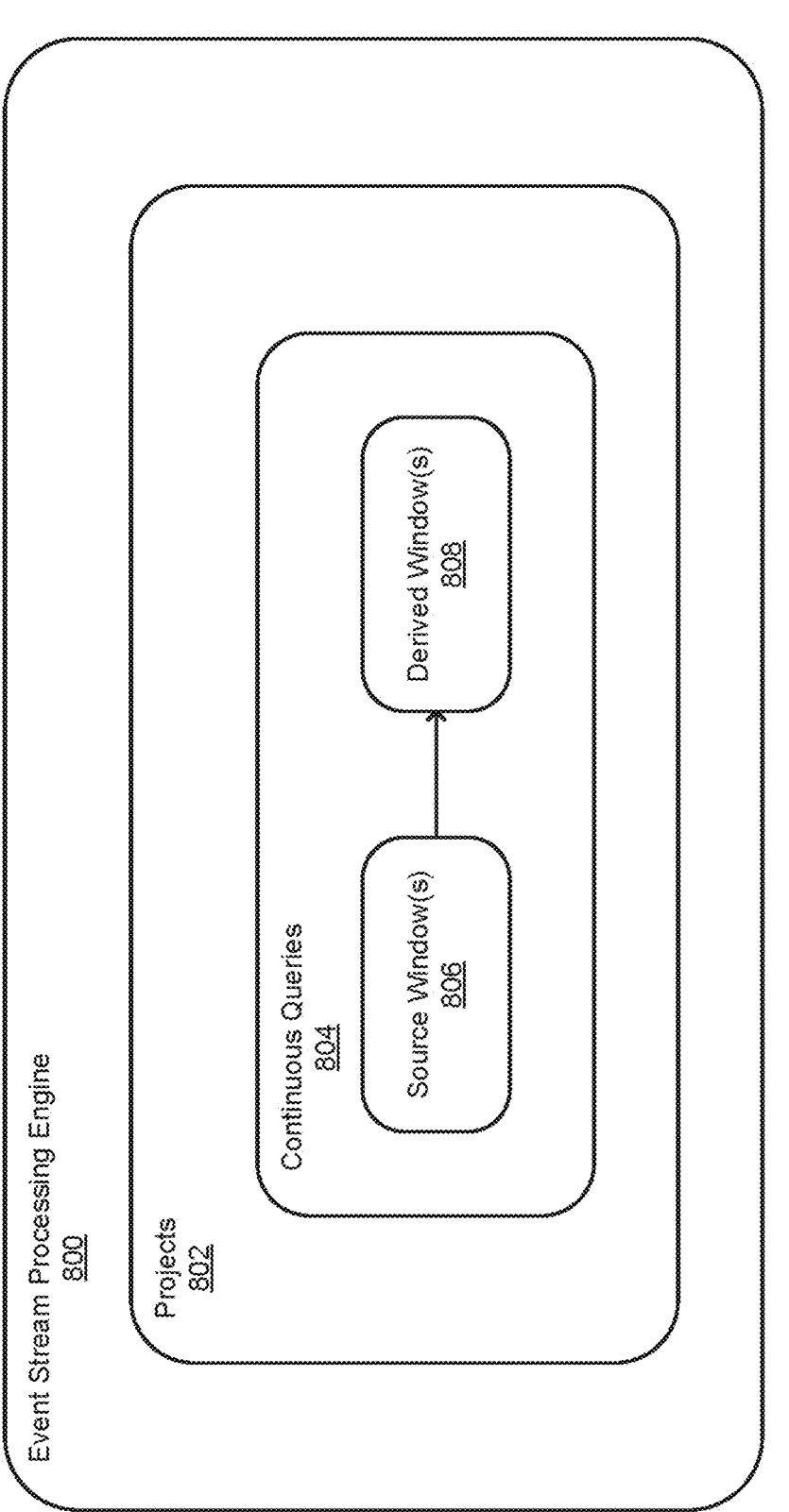
FIG. 8 illustrates a block diagram including components of an Event Stream Processing Engine (ESPE), according to embodiments of the present technology.
Figure 9:
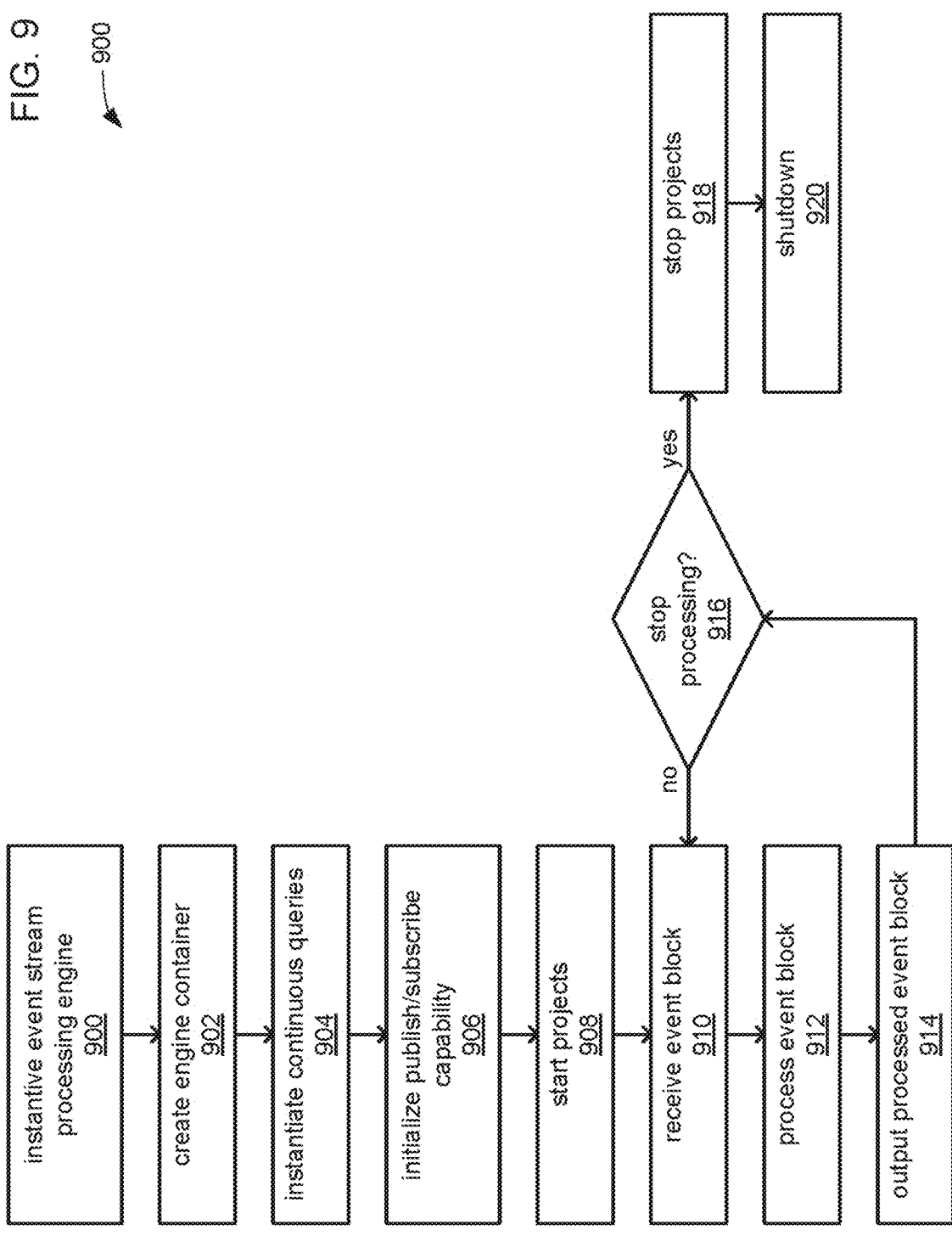
FIG. 9 illustrates a flow chart showing an example process including operations performed by an event stream processing engine, according to some embodiments of the present technology.
Figure 10:
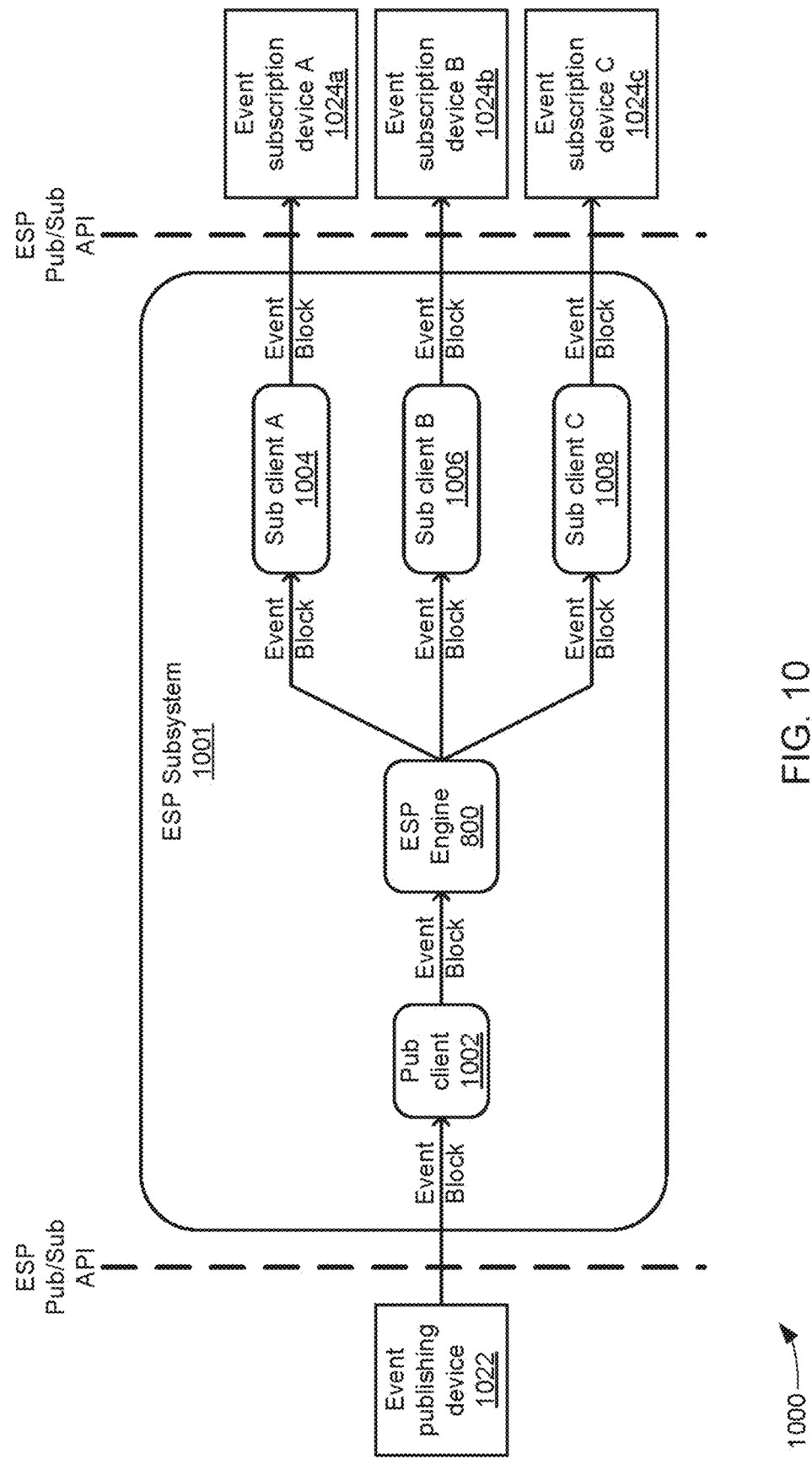
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLU-ETOOTH® communication channel or a BLUETOOTH® LOW Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
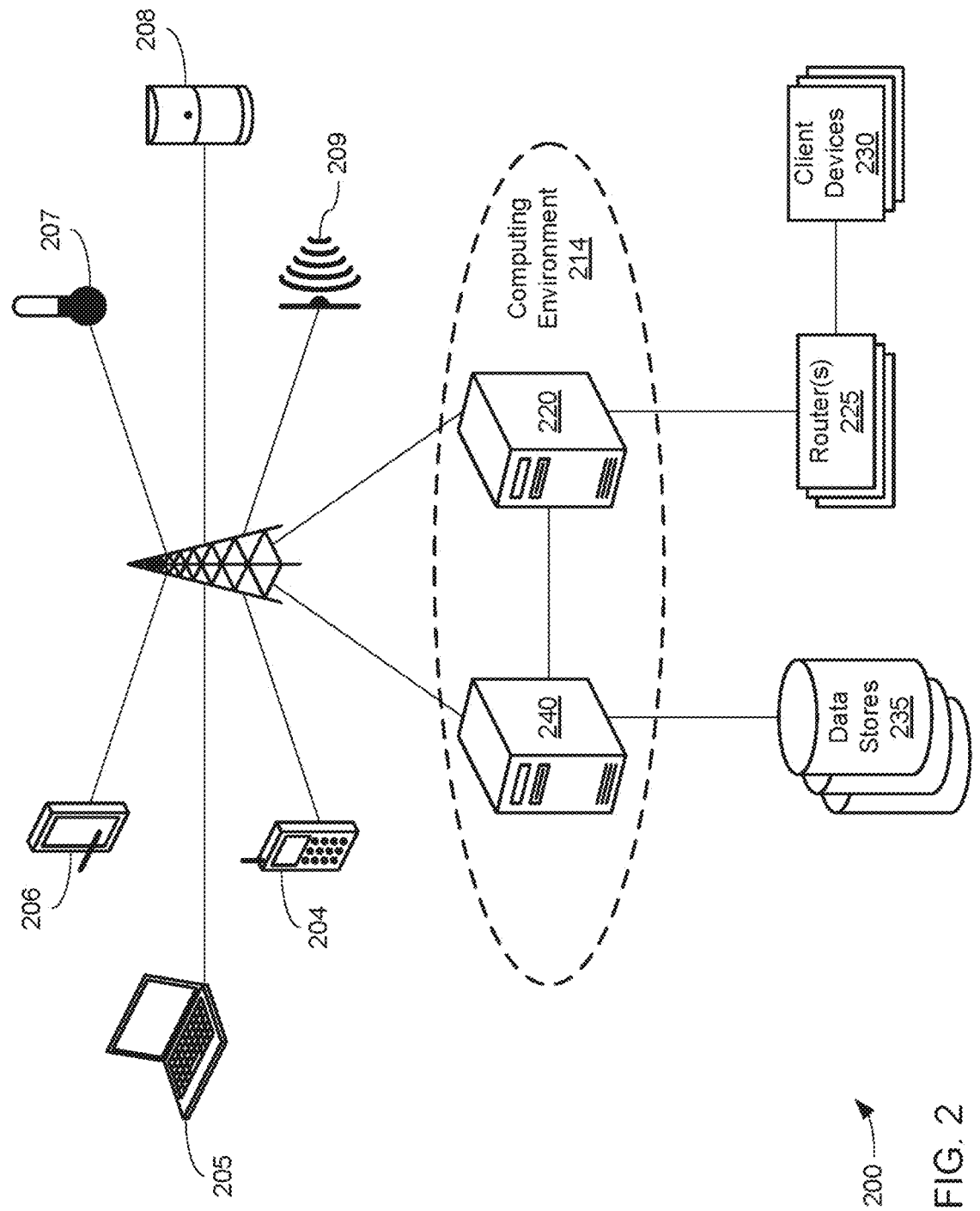
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
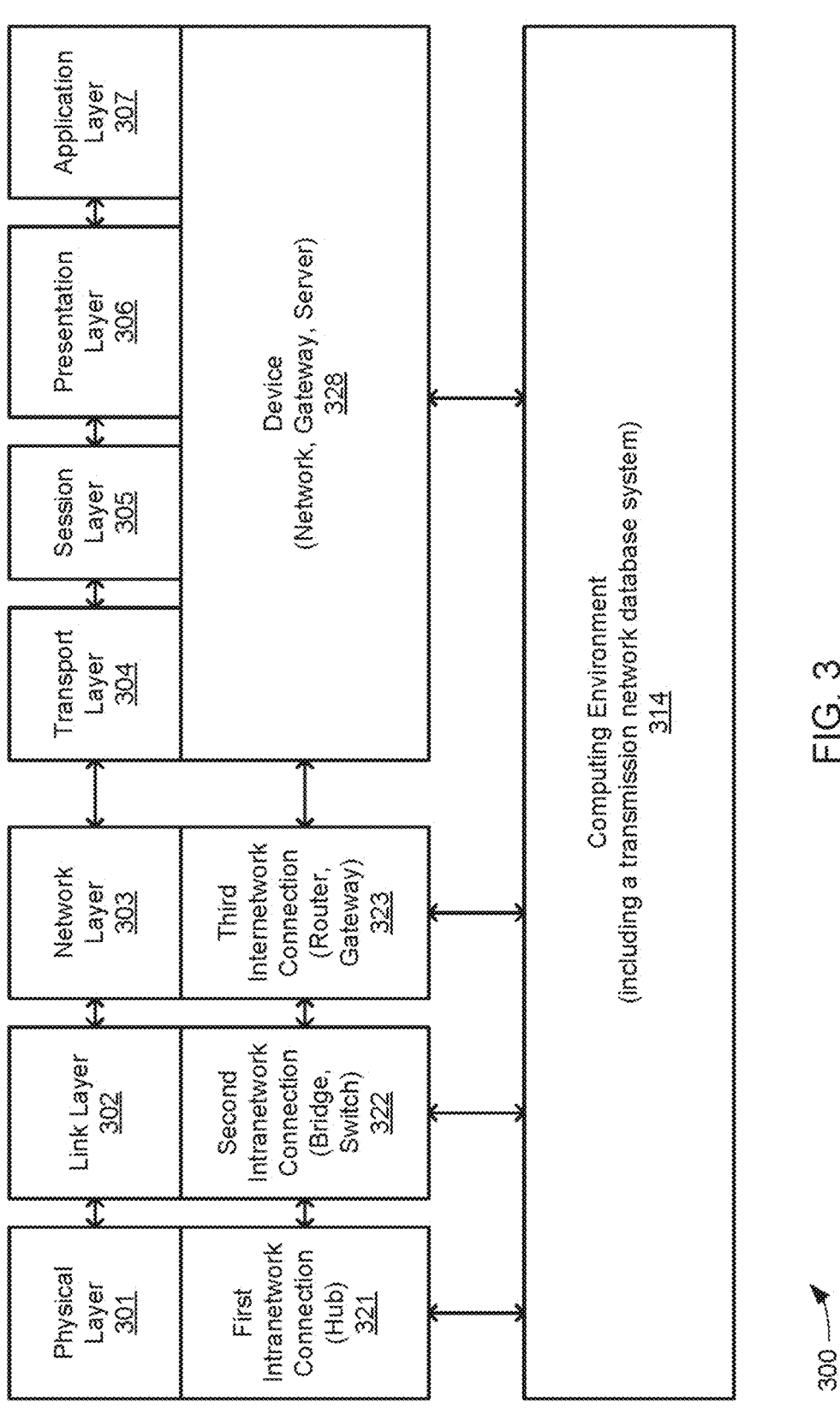
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Internetwork connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
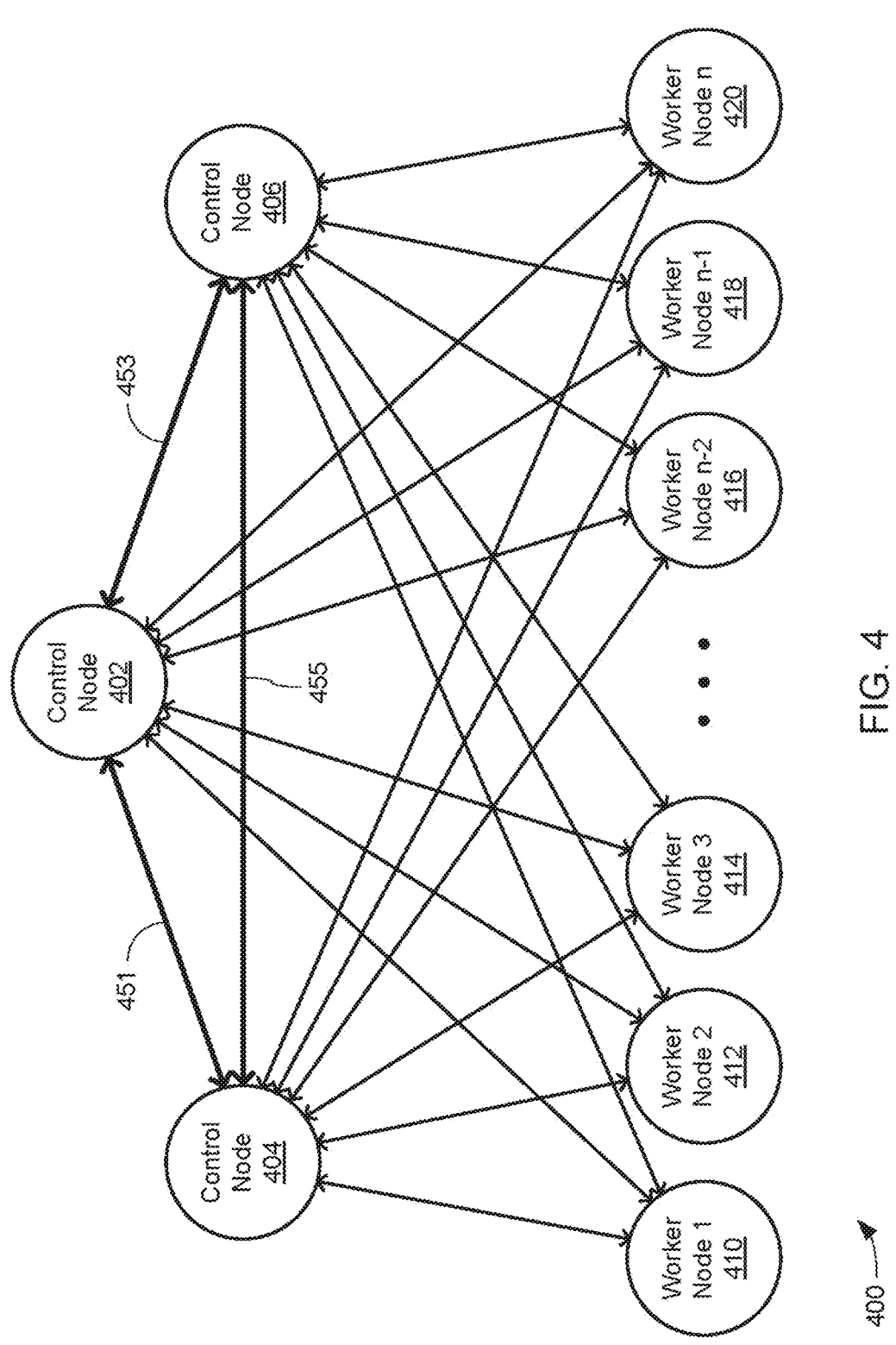
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
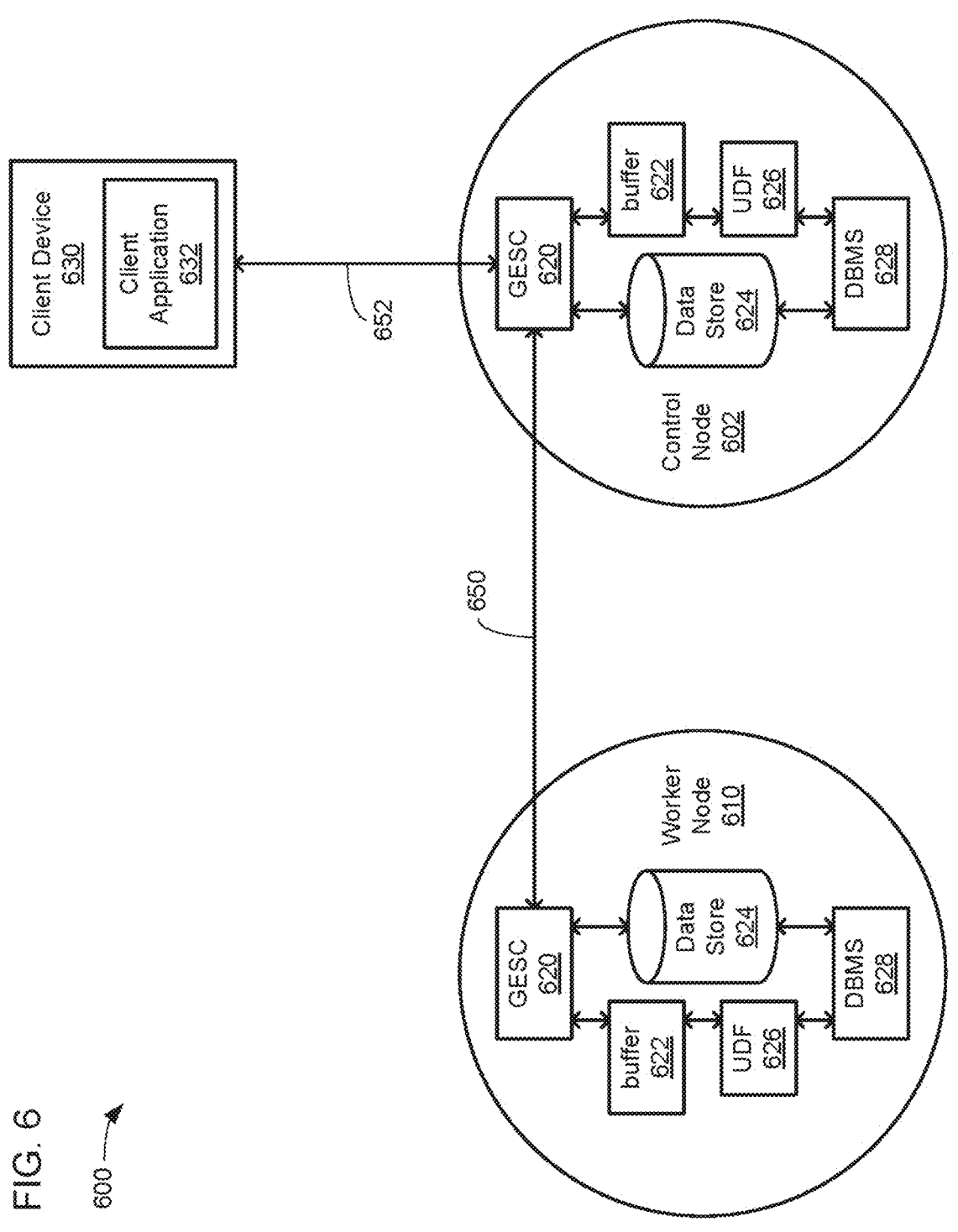
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive infor- mation from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software compo- nent (GESC) 620 that executes on the data processor asso- ciated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing envi- ronment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situa- tion, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory acces- sible by both the UDF and the GESC.

The GESC 620 at the nodes 602 and 620 may be con- nected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point com- munication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protect- ing against data loss using replication techniques. Replica- tion includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
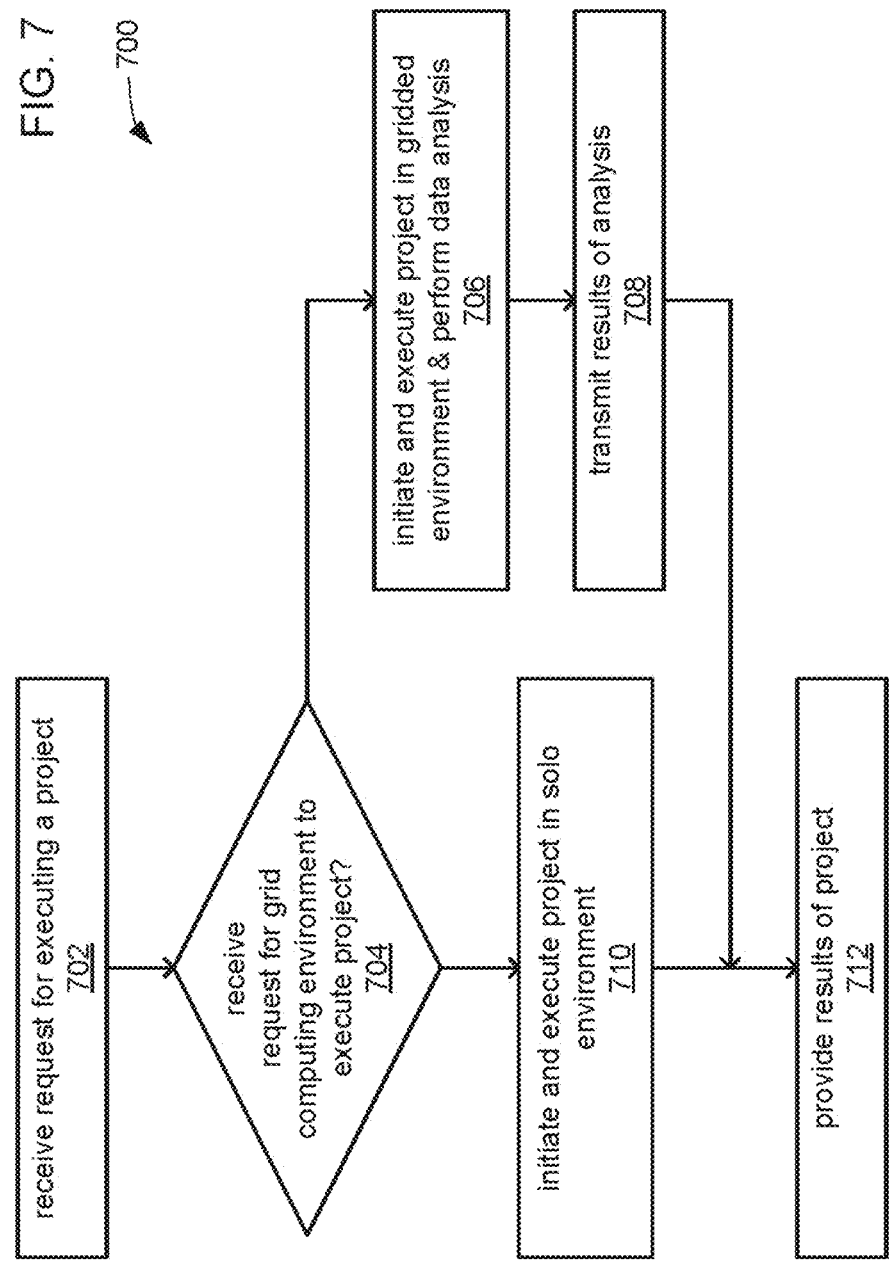
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing envi- ronment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested con- figuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a*-*c*, according to embodiments of the present technology. ESP system 1000 may include ESP device or subsystem 851, event publishing device 1022, an event subscribing device A 1024*a*, an event subscribing device B 1024*b*, and an event subscribing device C 1024*c*. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
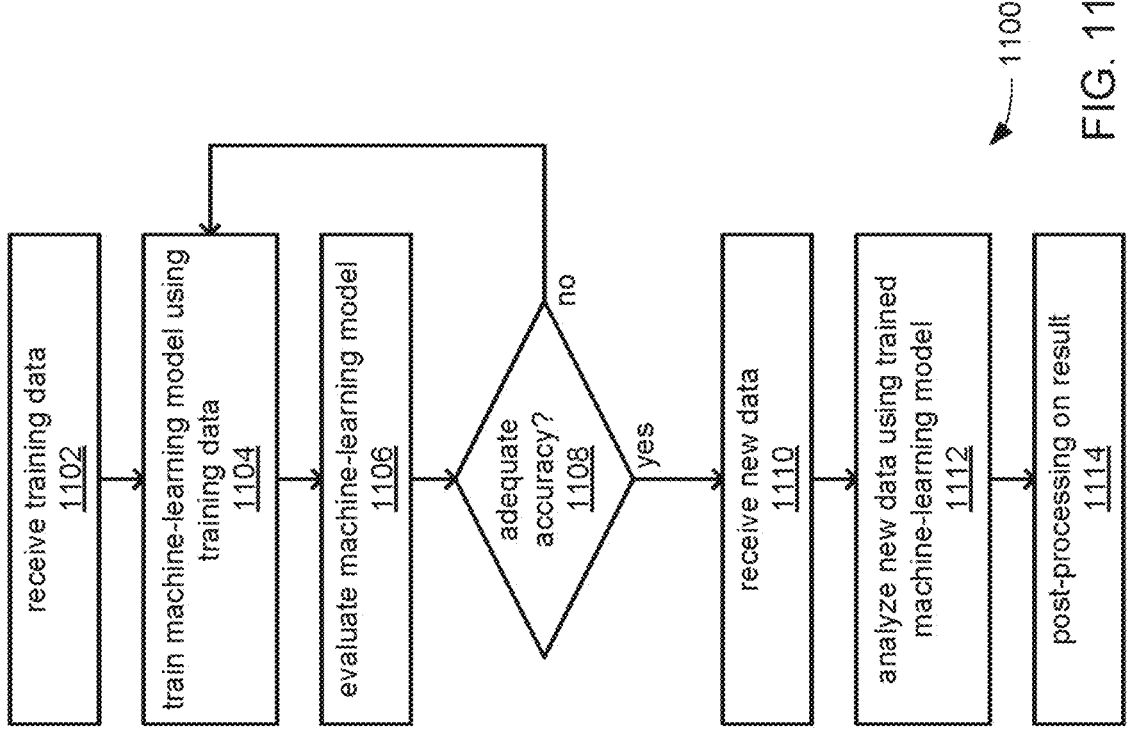
FIG. 11 illustrates a flow chart of an example of a process for generating and using a machine-learning model according to some aspects, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108. the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
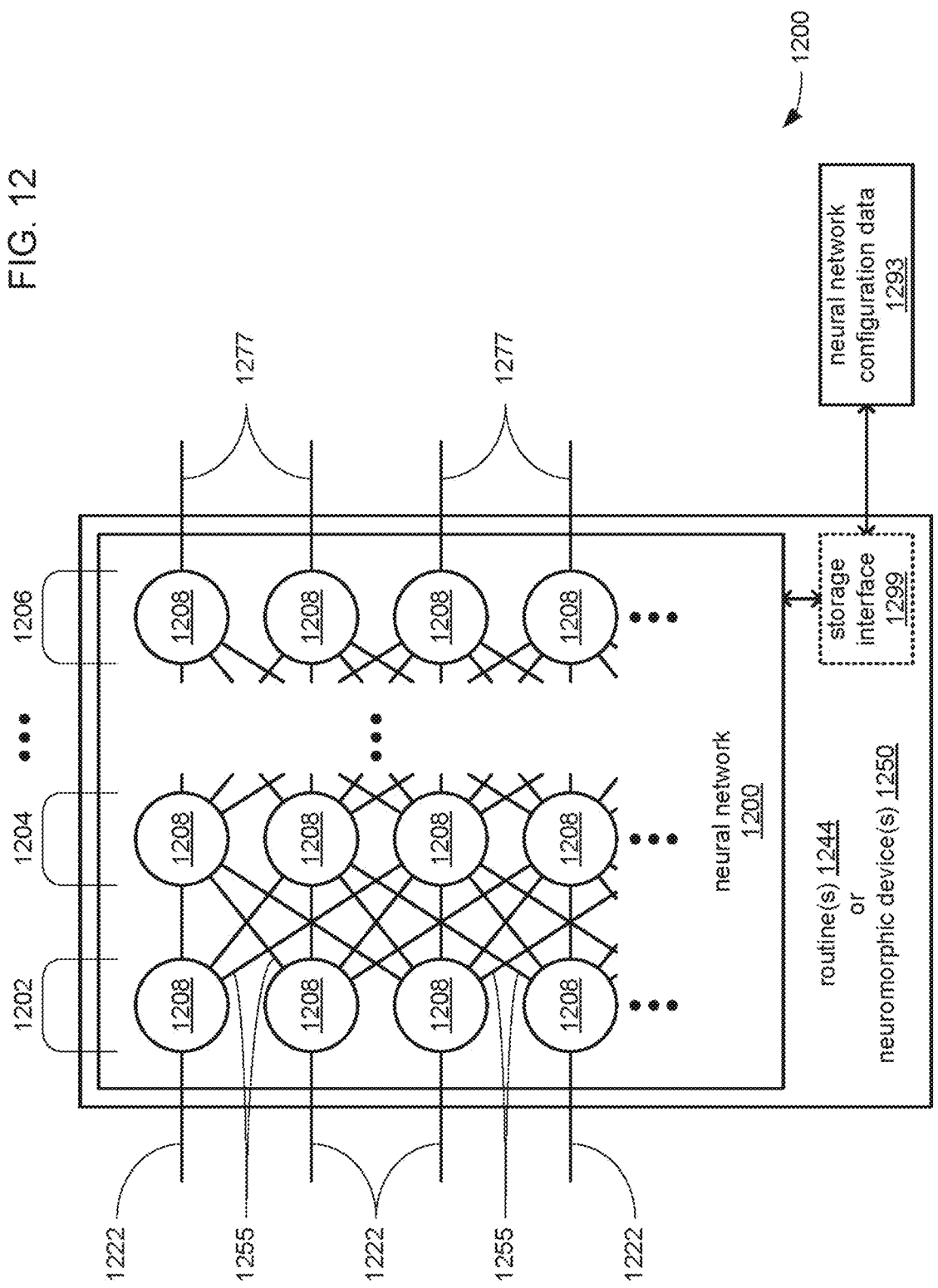
FIG. 12 illustrates an example of a machine-learning model as a neural network, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively, or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI)

accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
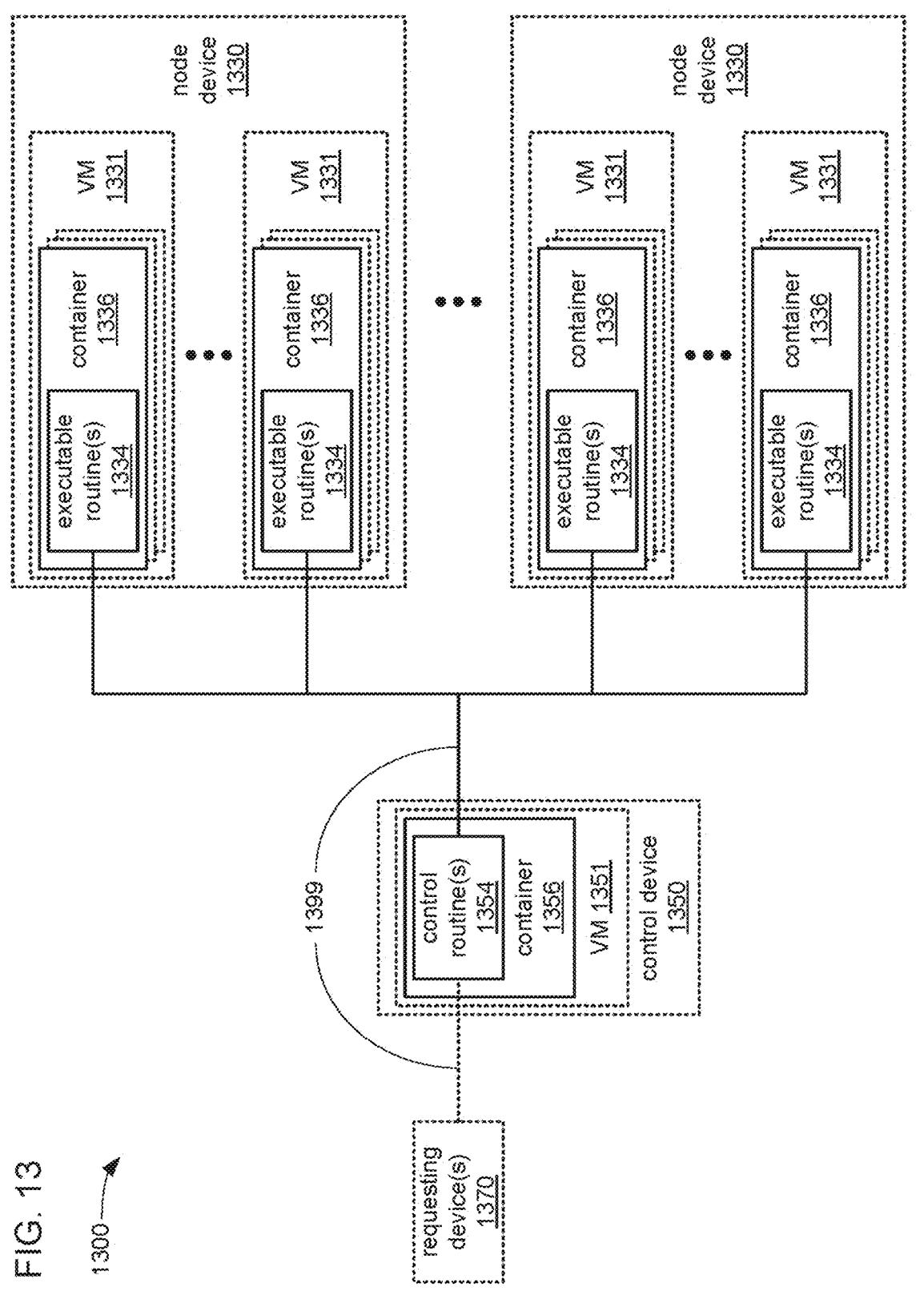
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively, or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively, or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the afore-described example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively, or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively, or additionally, such supporting routines may serve to provide access to one or more storage repositories (not specifically shown) in which at least data objects may be stored for use in performing the requested analyses.

Associated Processes

FIG. 14 illustrates a method 1400 for ingesting, validating, transforming, and persisting tabular data via a metadata-driven processing pipeline. It shall be appreciated that other embodiments contemplated within the scope of the present disclosure may involve more operations, fewer operations, different operations, or a different order of operations than illustrated in FIG. 14. In some embodiments, method 1400 may receive, via an application programming interface (API), an upload request that includes a logical table reference parameter and a structured data file. Based on the logical table reference parameter, method 1400 may identify a corresponding table metadata schema from a centralized table metadata repository. Using the table metadata schema, method 1400 may extract a plurality of column metadata definitions and dynamically convert entries from the structured data file into a plurality of schema-conforming data records by applying one or more validation criteria and associating valid cell values with their designated database column mappings. Method 1400 may then upload the schema-conforming data records to a database table specified in the table metadata schema, thereby enabling flexible and reusable tabular data processing across heterogeneous data layouts and schema definitions.

One of ordinary skill in the art will appreciate that embodiments of the present application, including the embodiments described in method 1400, may provide numerous technical advantages over conventional approaches to structured data processing and database management. In traditional systems, custom logic is often implemented for each individual table format, resulting in fragmented application code, rigid processing pipelines, and elevated maintenance costs when table structures evolve. By contrast, embodiments of the present application may utilize a centralized metadata schema that governs the ingestion, validation, transformation, and persistence of tabular data in a generalized and configurable manner. Such embodiments of the present application may allow structured data files to be processed uniformly regardless of variations in source formats enabling extensibility across new data models without requiring changes to processing logic.

Moreover, the metadata-driven architecture described in one or more embodiments of the present application may implement declarative column mappings, validation criteria, and transformation rules, each of which may be executed dynamically at runtime. As a result, embodiments of the present application may facilitate schema abstraction and runtime reflection, reducing the need for hard-coded procedures and increasing alignment with data governance policies. Operational scalability may be enhanced by isolating schema semantics from procedural logic thereby simplifying onboarding of new data sources and reducing the risk of data ingestion errors. Additionally, the separation of concerns between data payloads and processing configuration may improve modularity and reusability across enterprise-grade data ingestion platforms. Collectively, such capabilities, as described in the embodiments of the present application, may enable improved data processing efficiency, adaptability to evolving data landscapes, and reduced total cost of ownership in structured data environments.

As illustrated in FIG. 14, method 1400 may include operation 1410. At operation 1410, an API server may receive an upload request that includes a logical table reference parameter and a structured data file. In one or more embodiments, the upload request may be received over a network using a request/response communication protocol such as Hypertext Transfer Protocol (HTTP) and may invoke a designated endpoint configured for tabular data ingestion. In some embodiments, the logical table reference parameter may specify a logical alias or identifier corresponding to a data processing context, a table metadata schema, or table configuration stored in a metadata repository. The structured data file may comprise a tabular data structure (e.g., a spreadsheet file and/or the like) that includes a plurality of source column headers and a plurality of data entries associated with the source column headers.

Figures 15A, 15B:
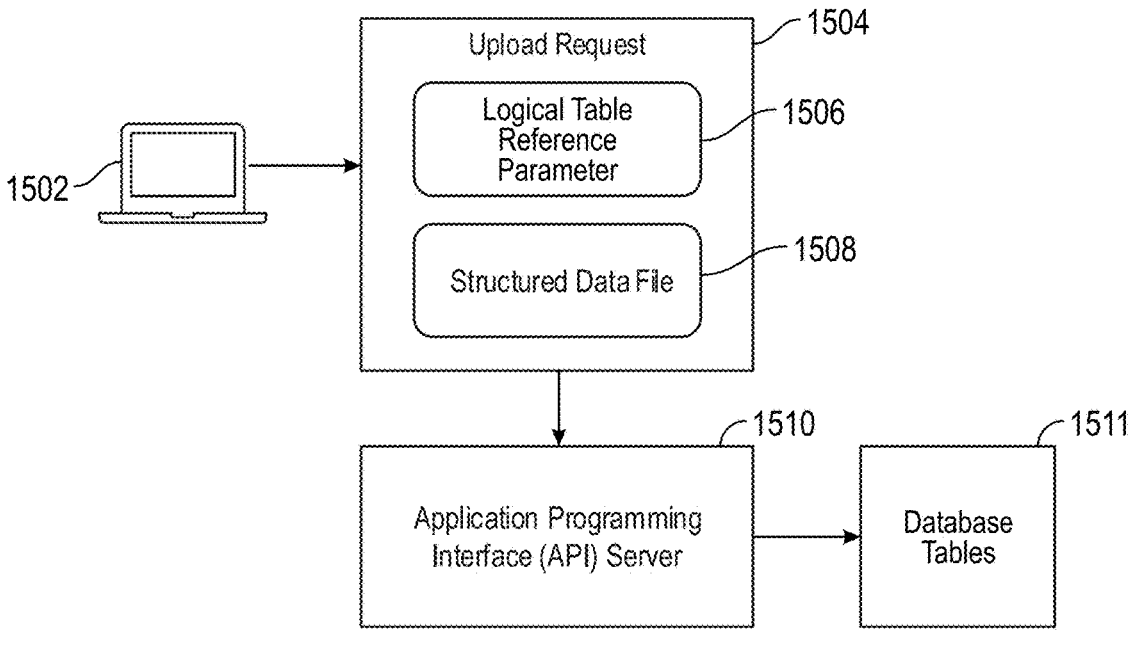
FIG. 15A illustrates an example schematic of a structured data file including a header row and a plurality of data rows, according to some embodiments of the present technology.
FIG. 15B illustrates an example schematic of a table metadata repository comprising one or more table metadata schemas, according to some embodiments of the present technology.

As illustrated in FIG. 15A, an API server 1502 may receive an upload request 1504 comprising a structured data file 1508 and a logical table reference parameter 1506. In some embodiments, upload request 1504 may be transmitted by a client system as an HTTP POST request, using a given HTTP method (e.g., HTTP method 1512A), such as to a component 1512, which may be an endpoint formatted as element 1513 of endpoint 1512B (e.g., /riskMarket/tabledata?tableType=PD_DATA), as shown by way of example in FIG. 15B. The request body (payload) 1512C, in such embodiments, may include the structured data file 1508, which may conform to a standard serialization format such as CSV, Excel, or JSON. Upon receiving the upload request 1504, the API server 1502 may extract the logical table reference parameter 1506 and the structured data file 1508 and prepare the data associated with the structured data file 1508 for further processing.

In some embodiments, the logical table reference parameter may function as a selector or lookup key used to determine which metadata schema to retrieve from a metadata repository. In various embodiments, the structured data file may represent a customer-uploaded data artifact, a batch export from an external system, or a programmatically generated file containing records to be ingested into a data processing pipeline. The structured data file, in one or more embodiments, may include one or more data records, each data record comprising a row of values associated with respective column headers and may be ingested in its entirety or in segments depending on system constraints.

In some embodiments, receiving the upload request may include storing in a computer memory cache or the like a temporary copy of the structured data file and/or initiating an asynchronous data ingestion pipeline. Additionally, or alternatively, the upload request may be authenticated and validated (e.g., element 1514 of response 1512D) to ensure that the upload request includes a syntactically correct logical table reference parameter and a parsable structured data file. Upon successful receipt and validation, the logical table reference parameter and structured data file may be passed to downstream processing modules for metadata resolution and data transformation as described in subsequent operations of method 1400.

Additionally, or alternatively, a set of computer-executable functions may be invoked by API server 1502 to execute various operations of method 1400 including, but not limited to, executing automated data ingestion and data transformation workflows. The computer-executable functions may include (1) searching the table metadata repository for a metadata schema based on the logical table reference parameter (e.g., operation 1420), (2) converting the data entries of a structured data file into schema-conforming data records (e.g., operations 1430, 1430A-1430E), and (3) uploading the data records to a database table (e.g., operation 1440). The computer-executable functions may be collectively or individually recycled or reused across multiple upload sessions reducing duplication and improving modularity. For example, upon receiving a second upload request comprising a second logical table reference parameter and a second structured data file, the same set of computer-executable functions of API server 1502 may be re-invoked to process the second request, identify a second table metadata schema, transform the second structured data file into a second set of schema-conforming data records, and upload the records to a second designated database table.

As illustrated in FIG. 14, method 1400 may proceed from operation 1410 to operation 1420. At operation 1420, a metadata resolution engine may search a table metadata repository to identify and retrieve a table metadata schema corresponding to the logical table reference parameter received in operation 1410. The table metadata repository, in some embodiments, may include a plurality of table metadata schemas, each table metadata schema uniquely associated with a respective logical table reference parameter and comprising metadata definitions that may be used to interpret, validate, and transform data from structured data files.

Figure 15C:
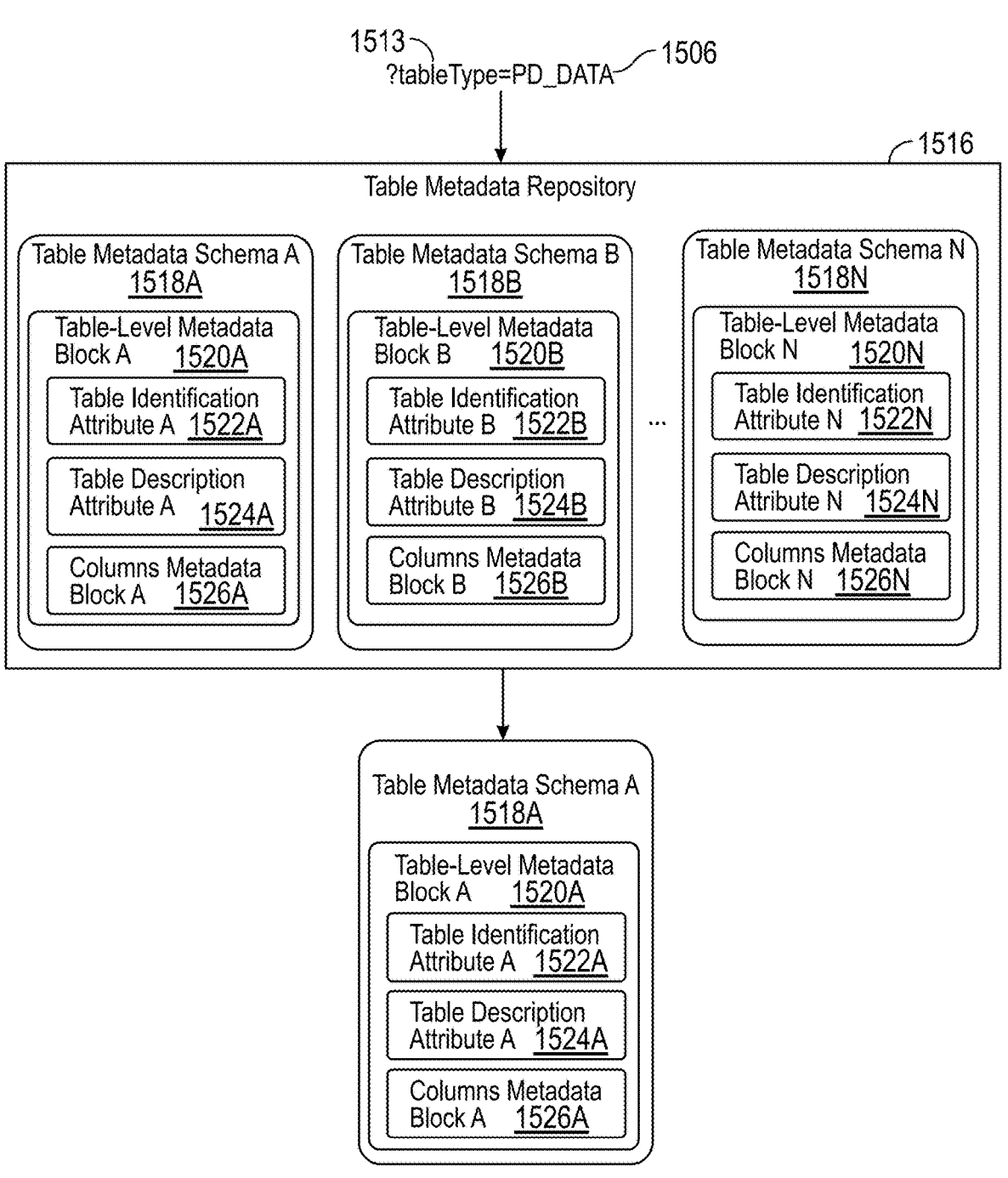
FIG. 15C illustrates an example table metadata schema comprising a table-level metadata block and a plurality of column metadata definitions, according to some embodiments of the present technology.

As illustrated in FIG. 15C, the table metadata repository 1516 may include one or more table metadata schemas 1518A-1518N. Each table metadata schema may comprise a table-level metadata block (e.g., 1520A-1520N), a table identification attribute (e.g., 1522A-1522N), a table description attribute (e.g., 1522A-1522N), and a columns metadata block (e.g., 1526A-1526N). The table identification attribute may specify the name, type, or alias of the corresponding database table, and the columns metadata block may define one or more column metadata definitions that describe the expected structure, type constraints, validation logic, and target mappings for each column in the table.

In some embodiments, a metadata resolution module or engine (e.g., implemented by API server 1502) may use the logical table reference parameter 1506 extracted from the upload request to perform a query against the metadata repository 1516. Upon matching the logical table reference parameter 1506 to a corresponding table metadata schema (e.g., schema 1518A), the metadata resolution engine may retrieve the associated metadata blocks and make them available to downstream components for subsequent data processing operations, such as schema mapping, validation, and transformation of the structured data file.

In one or more embodiments, the retrieval of the table metadata schema from the metadata repository 1516 may be implemented as a low-latency lookup operation and may be executed using either in-memory storage systems or external schema registries, depending on deployment configuration. In some embodiments, the table metadata repository may be versioned, enabling selection of the appropriate schema version based on additional parameters such as timestamp, environment, or tenant ID.

In various embodiments, the table metadata schema may operate as a declarative contract that governs how the structured data file is to be interpreted and/or transformed. For example, the columns metadata block 1526A may define expected source column identifiers, their corresponding database column mappings, data types, required field constraints, permissible value ranges, and enumerated value sets. The definitions of the columns metadata block 1526A may be used during subsequent operations (e.g., operations 1430A-1430D) to extract and validate data from the structured data file prior to storage in the target database table.

In some embodiments, table metadata schemas may also include optional transformation functions or preprocessing directives, which may be executed at runtime. A result of operation 1420 may be the successful retrieval and preparation of the table metadata schema for use in converting the structured data file into schema-conforming data records.

As illustrated in FIG. 14, method 1400 may include operation 1430. At operation 1430, a structured data processing engine may convert a plurality of data entries from the structured data file into a plurality of schema-conforming data records using the table metadata schema identified in operation 1420. In one or more embodiments, the conversion process may function to standardize and validate tabular data originating from heterogeneous sources and formats.

In some embodiments, the conversion process of operation 1430 may be implemented by one or more processing modules operating in conjunction, each configured to execute a particular phase of the data transformation pipeline. The structured data file, in some embodiments, may comprise a header row identifying a plurality of source column headers and one or more subsequent rows containing associated data entries. The table metadata schema may define a set of column metadata definitions, where each column metadata definition specifies a source column identifier, a corresponding target database column name, and a collection of validation and transformation constraints.

The conversion process of operation 1430 may include mapping or digitally associating the source column headers in the structured data file to metadata-defined column identifiers, extracting cell values associated with each column, evaluating the extracted data for compliance with validation criteria defined in the table metadata schema, and forming normalized data records that align with or match the destination database schema. In one or more embodiments, the validation criteria may include data type constraints, required field checks, enumerated value conditions, and value range specifications.

Additionally, or alternatively, each schema-conforming data record generated during operation 1430 may represent a row of data in which each value may be validated and associated with a specific database column as defined in a given table metadata schema. In such embodiments, operation 1430 may ensure consistency and integrity across all data records before storage or further processing of the data extracted from the structured data file. Accordingly, resulting data records process according to operation 1430 may be structured as key-value pairs, object-based representations, or row-wise tuples, depending on system design of the target database.

In various embodiments, the conversion process at operation 1430 may be implemented as a stateless or stateful transformation, with optional support for batch processing, streaming ingestion, or asynchronous execution. The schema-conforming data records produced by operation 1430 may be passed to a database import module or queued for downstream operations such as deduplication, enrichment, or export.

As illustrated in FIG. 14, operation 1430 may include operation 1430A. At operation 1430A, a metadata extraction module may extract a plurality of column metadata definitions from the table metadata schema retrieved during operation 1420. Each column metadata definition of the plurality of column metadata definitions may provide declarative structural and semantic information used to interpret, validate, and transform tabular data extracted from the structured data file. The extracted column metadata definitions may collectively define the expected schema for a corresponding database table, including the mappings or associations between source data fields and destination columns, as well as applicable constraints and processing logic.

In some embodiments, the table metadata schema may include a columns metadata block comprising a structured list, array, or table of metadata entries, where each entry corresponds to a distinct column expected in the target database schema. As illustrated in FIG. 15D, each column metadata definition (e.g., 1528A-1528H) may specify one or more of the following: (1) a source column identifier used to match against column headers in the structured data file (e.g., element 1530A-1530H), (2) a destination database column name (e.g., element 1532A-1532H), (3) a data type designation (e.g., element 1534A-1534H), integer, decimal, date, text, (4) one or more validation criteria including minimum/maximum thresholds, enumerated value constraints, or nullability rules (e.g., element 1536A-1536H), and (5) optional transformation directives such as normalization logic, formatting rules, or unit conversions (e.g., element 1538A-1538H).

Additionally, or alternatively, the column metadata definitions may be retrieved in their entirety or selectively based on filtering logic applied to the table metadata schema. In some implementations, the metadata extraction module may normalize or tokenize the metadata definitions into a uniform intermediate representation suitable for downstream processing. The extracted metadata definitions may then be registered with one or more runtime modules responsible for column recognition, value validation, and record generation.

By extracting column metadata definitions at operation 1430A, the structured data processing system may enable the dynamic interpretation of structured data files based on schema-driven logic, rather than relying on hard-coded rules or manual configuration. In such embodiments, the use of column metadata definitions at operation 1430A may facilitate flexible processing of structured data across evolving table structures and reduce maintenance overhead associated with schema changes. The extracted column metadata definitions may also function as a baseline for ensuring data integrity and for verifying that incoming data complies with the expected structure and constraints defined by the corresponding table metadata schema.

In one or more embodiments, the remarks field associated with a given column metadata definition (e.g., element 1533E) may include a first set of tokens that describe column mappings (e.g., COL_ID, SRC_NAME, TARGET_NAME), as well as a second set of tokens that encode one or more callable validation functions (e.g., element 1532H). Each token in the second set of tokens may reference a function name or symbolic identifier that maps to a precompiled validation function implemented in underlying source code.

In such embodiments, upon detecting the presence of the second set of validation tokens, a metadata parsing module may dynamically interpret the validation remark (e.g., element 1532H) as an executable instruction and may resolve the symbolic identifier to a function entry point defined within a codebase accessible by a system implementing method 1400. Upon resolution, a runtime execution module may invoke the referenced function, which may in turn retrieve a validation parameter set (e.g., allowable values, conditional thresholds, or logical rules) from an in-memory structure or a database lookup table.

By contrast to static validation tokens previously described (e.g., element 1532E), which may define enumerated lists of allowable values inline within the metadata definition, the function-based approach may defer validation rule resolution until runtime and may enable centralized control of validation logic. For example, a validation function token may reference a configuration table that contains a dynamically modifiable list of acceptable values associated with a particular source column. Upon invocation, the validation function may access the configuration table, retrieve the appropriate reference dataset, and evaluate each input value accordingly.

Accordingly, the function-referenced validation architecture may improve extensibility and maintainability by allowing data validation rules to be updated independently of the table metadata schema. In such instances, the technique may also reduce the burden on users to explicitly define all enumerated values within the remarks section of the metadata definition, while still ensuring conformance with governed validation rules.

Additionally, or alternatively, the use of function-based validation tokens in the remarks section may enable complex validation operations such as inter-column consistency checks, conditional dependency resolution, or regular expression matching. In some embodiments, the remarks field may include composite tokens that specify both the name of the validation function and a set of arguments or contextual parameters to be passed at runtime.

Accordingly, in response to detecting such validation function tokens during operation 1430A, the structured data processing system may activate an execution pathway that invokes the referenced validation logic, thereby enhancing the dynamic capability and functional expressiveness of column metadata definitions used to govern schema validation workflows.

As illustrated in FIG. 14, operation 1430 may include operation 1430B. At operation 1430B, a column header recognition module may identify a plurality of source column headers within the structured data file that correspond to a plurality of source column identifiers specified in the column metadata definitions extracted during operation 1430A. Operation 1430B may include scanning the header row of the structured data file, parsing the column labels present in the header row, and performing a matching process that aligns the parsed column labels with the metadata-defined source column identifiers. As a result, operation 1430B may function to produce a one-to-one or one-to-many mapping between structured data file columns and logical schema definitions for downstream operations to process the correct fields using schema-aligned logic.

In some embodiments, the structured data file may include a header row containing human-readable column names, such as "ProbabilityOfDefault," "AccountNumber," or "PD_Score." The source column headers, in such embodiments, may appear in the first row of the file or in a designated row position as determined by configuration. The column metadata definitions may specify abstract source column identifiers intended to match these headers through exact comparison, normalized token comparison, case-insensitive matching, alias resolution, or other heuristic matching techniques.

As illustrated in FIG. 15E, a metadata-driven column recognition module 1546 may receive the structured data file and the column metadata definitions and perform an identification procedure to align source column headers 1542A-1542M with metadata-defined identifiers. In various embodiments, the matching logic may also support header alias resolution based on a dictionary of known synonyms, alternate names, or locale-specific translations.

Additionally, or alternatively, the identified source column headers may be stored as a mapping table or an indexed lookup structure that pairs each matched source column header with a corresponding column metadata definition. In such embodiments, the mapping table may function as the foundational reference for subsequent parsing, validation, and transformation operations. For unmatched source column headers, the structured data processing engine may optionally log warnings or exclude the associated columns from processing. Similarly, if one or more expected source column headers are not found in the structured data file, the structured data processing engine may trigger schema mismatch alerts or halt ingestion depending on enforcement settings.

Accordingly, operation 1430B enables the structured data processing engine to interpret user-submitted or externally generated structured data files in a flexible and schema-compliant manner, while preserving consistency with enterprise-defined data standards and avoiding reliance on rigid or positional column ordering.

As illustrated in FIG. 14, operation 1430 may include operation 1430C. At operation 1430C, a source data parsing module 1547 may parse a plurality of data entries from a structured data file to generate a plurality of cell value sets (e.g., elements 1548A-1548D) associated with a plurality of identified source column headers. In some embodiments, each cell value set may represent a vertically aligned collection of cell values occurring under a single source column header and may correspond to a sequence of values extracted from a defined region within the structured data file.

Figures 15F, 15G:
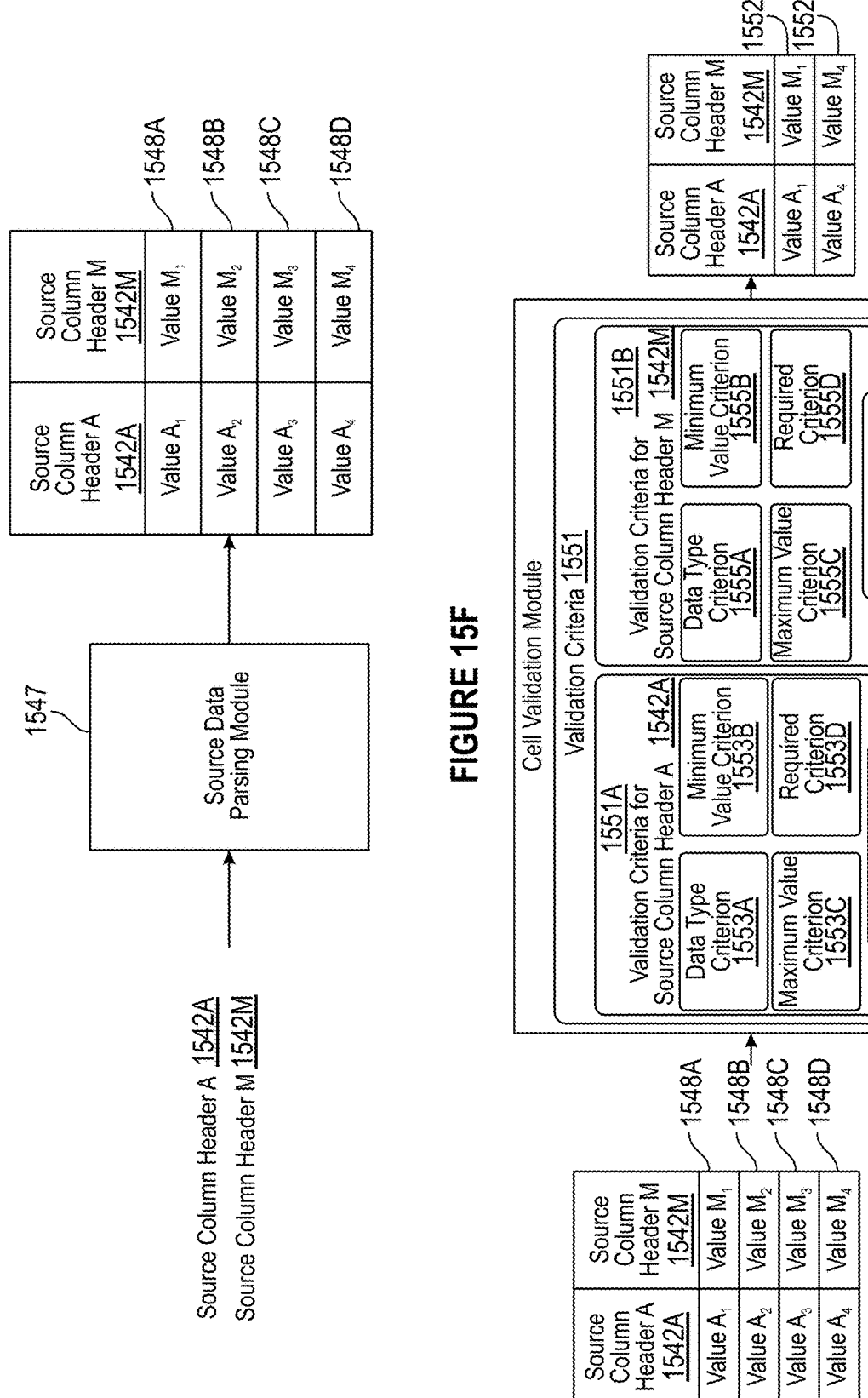
FIG. 15F illustrates an example process for parsing a plurality of data entries into a plurality of cell value sets based on the mapped source column headers, according to some embodiments of the present technology.
FIG. 15G illustrates an example process for validating the plurality of cell value sets using validation criteria defined in the column metadata definitions, according to some embodiments of the present technology.

Additionally, or alternatively, the structured data file may include a plurality of rows, each comprising a set of cell values positioned under a predefined arrangement of source column headers. As illustrated in FIG. 15F, each column header (e.g., 1542A, 1542M) may be associated with one or more values such as Value A1 through Value A4 or Value M1 through Value M4. Parsing, in some embodiments, may include reading data entries row by row and associating each value with its respective source column header based on positional alignment or schema-based column mapping logic established during operation 1430B.

The source data parsing module 1547 may construct each cell value set as a discrete data structure, such as an array, list, or stream, depending on implementation and processing mode. Accordingly, in various embodiments, each cell value set may be indexed or keyed by the corresponding source column header identifier and may be stored in a staging buffer or intermediate memory space for subsequent validation and transformation. In some embodiments, parsing may support streaming ingestion, such that each cell value is parsed and processed incrementally as data is received.

Additionally, or alternatively, parsing may be performed using a format-aware parser capable of interpreting delimiter-separated values, fixed-width fields, JSON structures, or other supported serialization formats. The parsing logic may optionally include preprocessing steps such as whitespace trimming, encoding normalization, or escape sequence resolution to ensure semantic fidelity of extracted values.

As illustrated in FIG. 14, operation 1430 may include operation 1430D. At operation 1430D, a cell validation module 1550 may evaluate a plurality of cell value sets parsed in operation 1430C against validation criteria defined in a plurality of column metadata definitions extracted in operation 1430A, as shown by way of example in FIG. 15G. Each validation criterion may define one or more conditions that should be satisfied for a cell value to be considered valid for use in a schema-conforming data record.

Figures 15H, 15I:
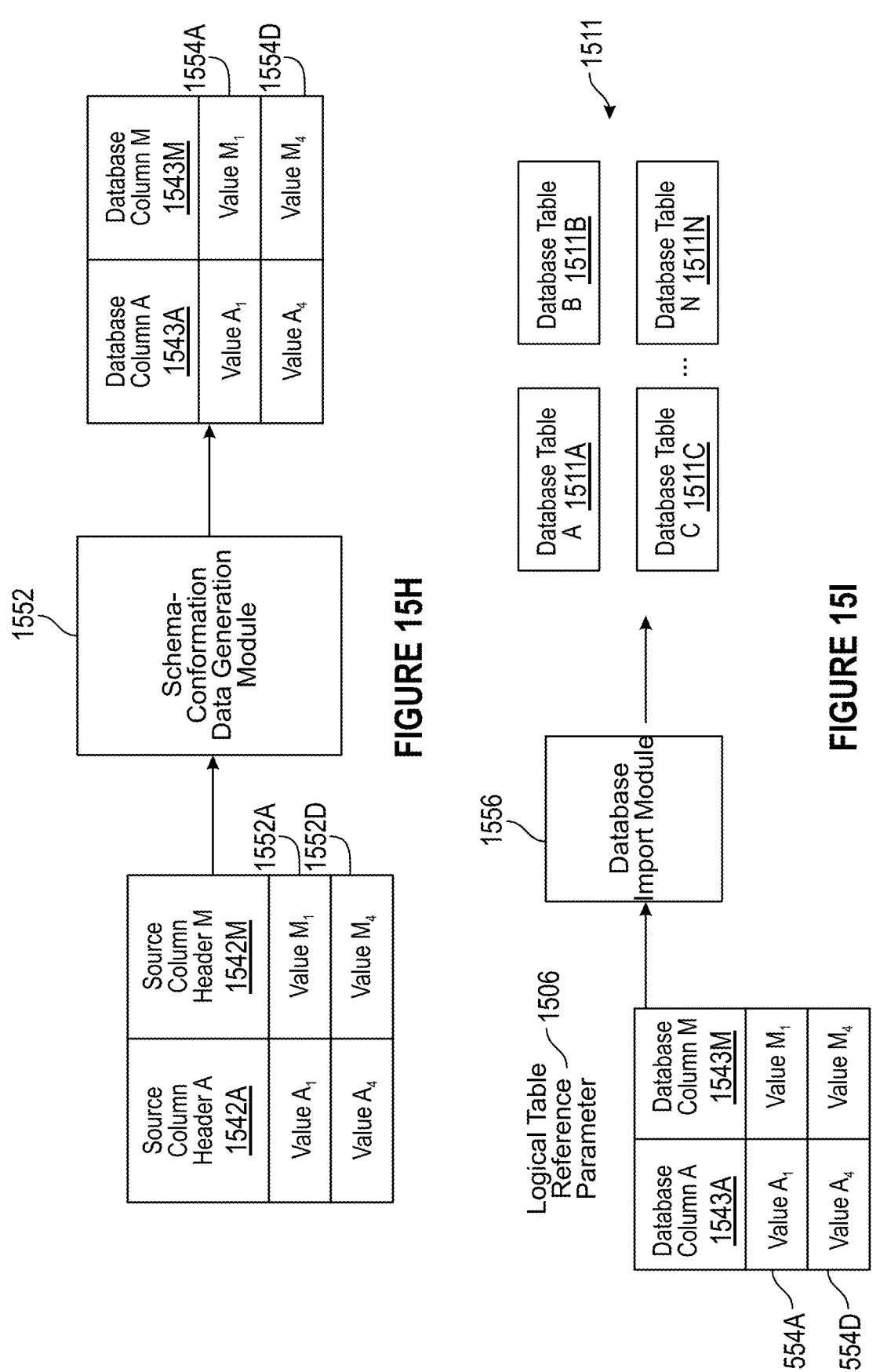
FIG. 15H illustrates an example set of schema-conforming data records generated by associating valid cell value sets with a set of database columns defined in the metadata schema, according to some embodiments of the present technology.
FIG. 15I illustrates an example process for persisting the schema-conforming data records to a database table designated in the table metadata schema, according to some embodiments of the present technology.

As illustrated in FIG. 15I, validation criteria 1551 (e.g., element 1551A, element 1551B) may be associated with a given source column header and may include: (1) a data type criterion (e.g., string, numeric, date) 1553A or 1555A, (2) a minimum value constraint 1553B or 1555B, (3) a maximum value constraint 1553C or 1555C, (4) a required field flag 1553D or 1555D indicating non-nullability, and (5) an enumerated value constraint 1553E or 1555E defining an allowed set of categorical values.

In one or more embodiments, each cell value within a given cell value set may be independently validated against the applicable validation criteria. The cell validation module 1552, which may sometimes be referred to herein as the "validation module", may evaluate each criterion sequentially or in parallel depending on system architecture. In a non-limiting example, if a cell value evaluated by the cell validation module fails any of the applicable validation criteria, the failing cell value may be flagged, logged, excluded from further processing, or substituted by the cell validation module 1552 based on a default cell handling policy.

Additionally, or alternatively, validation logic may incorporate coercion functions to cast or reformat values into expected data types prior to evaluation. For instance, a numeric string such as "123.00" may be interpreted as a decimal number if the corresponding data type criterion expects a decimal. Similarly, categorical values may be compared against case-insensitive representations of allowed values defined in enumerated lists.

For each source column header, a filtered cell value set (e.g., element 1552A, element 1552D) may be generated that includes only the cell values passing all required validation criteria. Accordingly, operation 1430D, once completed, may produce a collection of validated cell value sets, each associated with a source column header and each ready for association with a destination database column as defined in operation 1430E.

As illustrated in FIG. 14, operation 1430 may include operation 1430E. At operation 1430E, a schema-conforming data generation module 1552 may generate a plurality of structured data records by associating validated cell value sets with respective database column identifiers defined in a plurality of column metadata definitions. Each schema-conforming data record may be constructed by aligning each validated cell value with a corresponding target column based on a mapping derived from the metadata schema retrieved in operation 1420 and interpreted in operation 1430A.

In some embodiments, operation 1430 implementing a structured data processing system may detect whether a structured data file includes data entries that are not compatible with a designated database table. In such embodiments, operation 1430 may function to determine whether data entries of a structured data file may be compatible or incompatible based on the table metadata schema associated with the logical table reference parameter. If one or more data entries deviate from the expected format, structure, or constraints defined in the table metadata schema, a data normalization module may automatically convert the data entries into schema-conforming data records by applying column mappings, data type casting, and validation heuristic enforcement. The automatic conversion of non-conforming data into a schema-aligned format may enable ingestion of data files that would otherwise fail strict validation.

As illustrated in FIGS. 15G and 15H, each valid cell value set (e.g., Value A1 through Value A4) may be linked to a database column (e.g., 1543A, 1543B) that corresponds to a source column identifier from the column metadata definitions. The schema-conforming data generation module 1552 may use a column mapping structure previously established during operations 1430A and 1430B to associate each source column header with a destination schema field. Valid cell values from each cell value set may then be sequentially or concurrently written into data record structures (e.g., 1554A, 1554D), with each data record structure formatted to comply with a schema of the target database table.

Additionally, or alternatively, each structured data record generated by the schema-conforming data generation module 1552 may include a defined set of key-value pairs, wherein each key corresponds to a database column identifier and each value corresponds to a validated, typed, and sanitized cell value. In some embodiments, data record formats may vary based on implementation, including but not limited to row-based arrays, JSON objects, or SQL-ready tuples.

In some implementations, during the generation process, additional logic may be invoked to enforce type coercion, apply default values for missing optional fields, or incorporate derived fields based on transformation directives embedded within the column metadata definitions. In such implementations, error-handling routines may capture and isolate partial records in cases where some, but not all, required fields are present or valid.

Additionally, or alternatively, schema-conforming data records produced by operation 1430E may be temporarily buffered in memory, serialized into a staging format, or directly forwarded to a downstream database import module (e.g., 1556) for insertion into a persistent storage system. It shall be recognized that the generation of fully validated and structurally aligned data records at operation 1430E ensures compatibility with metadata-governed storage systems and supports scalable ingestion workflows across variable table schemas.

As illustrated in FIG. 14, method 1400 may proceed from operation 1430 to operation 1440. At operation 1440, a database import module may persist a plurality of schema-conforming data records generated in operation 1430E to a designated database table identified within a table metadata schema retrieved in operation 1420. Each schema-conforming data record may comprise a validated and structured representation of a row of tabular data, with each field aligned to a defined database column as specified in a corresponding column metadata definition.

As illustrated in FIG. 15I, a database import module 1556 may receive the collection of schema-conforming data records and direct the collection of schema-conforming data records to a target database table 1511A-1511N of database tables 1511 based on the logical table reference parameter 1506 and the corresponding table identification attribute within the table metadata schema. In some embodiments, each schema-conforming data record may be inserted using a parameterized query or a bulk data insertion interface to ensure efficient throughput and transactional consistency.

In some embodiments, prior to persistence, each data record of the plurality of schema-conforming data records may be transformed into a compatible format required by the underlying database engine. In such embodiments, record transformation may include serialization into SQL-compliant insert statements, conversion to binary load formats, or invocation of a batch API supported by the database system. In some implementations, schema verification may be re-applied at the database layer to ensure congruence between incoming data and the actual structure of the target database table.

Additionally, or alternatively, persistence operations may be performed in parallel, sequentially, or in batches, depending on system configuration and performance constraints. Database connection pooling, transaction buffering, and retry logic may be employed to ensure fault tolerance and consistent state recovery in the event of partial persistence failures.

Additionally, or alternatively, upon completion of the persistence process, the database import module may generate a status output (e.g., 1512D) indicating success or failure (e.g., 1514) of each record insertion. Status tracking may be persisted for auditing, rollback, or reconciliation purposes. Optional metadata such as row-level timestamps, ingestion batch identifiers, or source file references may be included to support traceability and downstream lineage analysis.

Additionally, or alternatively, operation 1440 implementing a structured data processing system may include functionality for generating and transmitting real-time status messages (e.g., 1514) in response to the successful upload of schema-conforming data records to a designated database table. In such embodiments, an upload response module may generate a real-time response confirming that the upload request was successfully processed. The real-time response may include metadata such as a timestamp, an ingestion batch identifier, a summary of the number of records uploaded, or other contextual information. Upon generation, the real-time response may be transmitted to a client device that initiated the upload request via the API server 1502 providing immediate feedback and user confirmation.

In some embodiments, a broadcast messaging module may also be automatically initiated or invoked following the successful insertion of schema-conforming data records. The broadcast messaging module may transmit a real-time message to one or more downstream software applications that are subscribed to updates associated with the target database table. The real-time message may indicate that new schema-conforming data records have been uploaded and committed. The messaging functionality of the broadcast messaging module may allow dependent systems or applications to take automated actions based on data availability, such as automatically executing workflows, refreshing dashboards, or executing alert logic.

Additionally, or alternatively, the real-time message broadcast to one or more subscribed software applications may include structured metadata that describes the upload event. The structured metadata may include one or more of the following: a summary of the uploaded data records, a hyperlink or URI for accessing the ingested data, and an alert indicator flagging downstream user action. Upon receiving the real-time message, a subscribed application may transmit a notification to one or more user accounts registered with the application. The notification may include contextual information from the upload operation such as data type, batch summary, and recommended next steps for the user.

In some implementations, uploading schema-conforming data records to the designated database table completes the ingestion lifecycle for structured tabular data and enables downstream access through query engines, reporting systems, or analytical applications governed by the same metadata definitions.

Figure 15J:
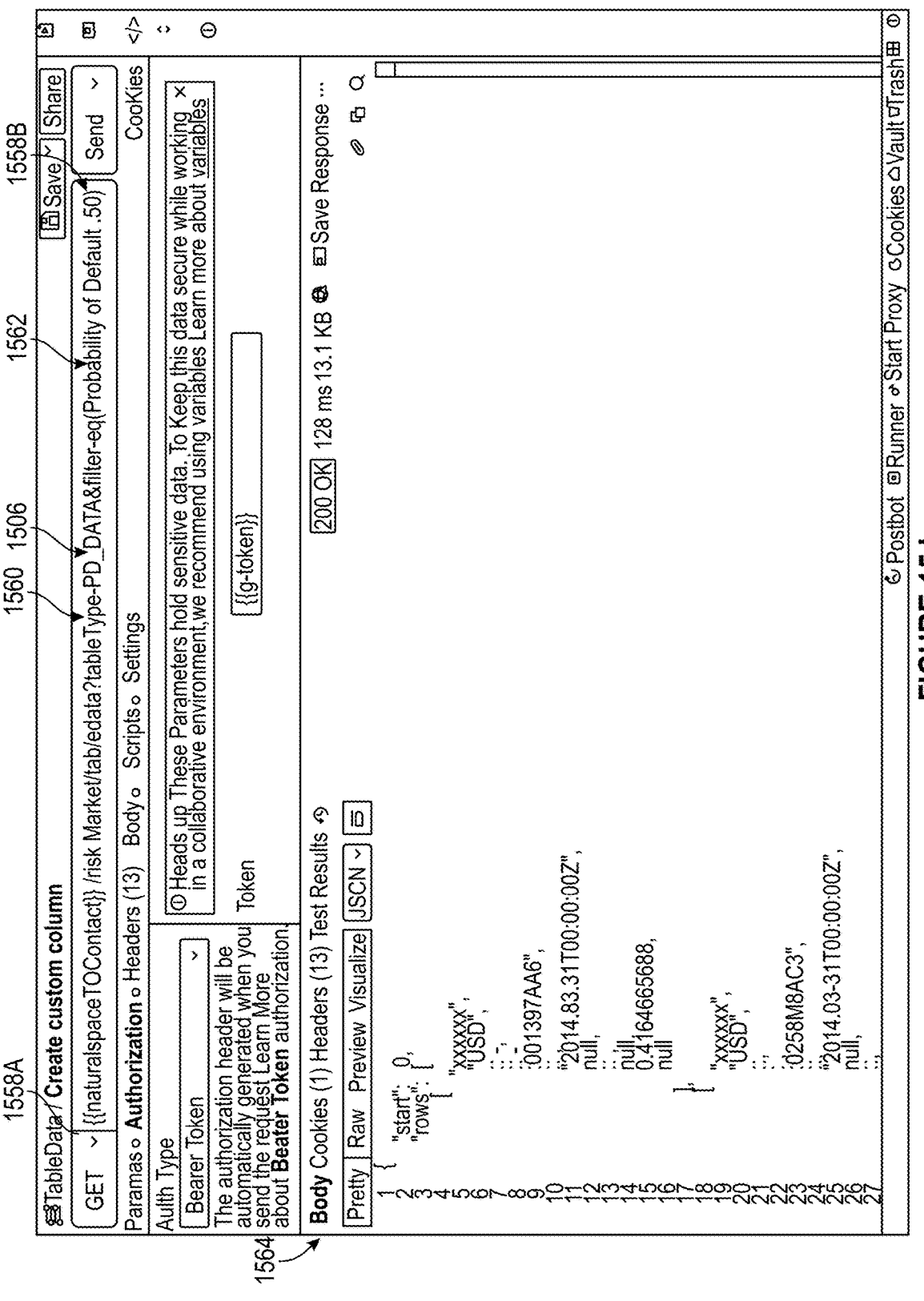
FIG. 15J illustrates an example query request issued via an API server to retrieve schema-conforming data records using a logical table reference parameter and filter parameter, according to some embodiments of the present technology.

Accordingly, in some embodiments, a structured data processing system may support query execution against previously uploaded schema-conforming data records by reflecting metadata definitions associated with a logical table reference parameter. As illustrated in FIG. 15J, a client system may issue query request 1580 via API server 1502. Query request 1580 may specify an HTTP method 1558A, such as a GET request, for retrieving schema-conforming data records stored in a database table 1511 that corresponds to a structured data file 1508. Query request 1580 may be directed to a URL endpoint 1558B that may include a logical table reference parameter 1506 and a filter parameter 1562, both of which may be expressed as query parameters. The logical table reference parameter 1506 may identify a table metadata schema associated with the structured data file 1508, while the filter parameter 1562 may define constraints to be applied during the retrieval operation.

In response to receiving the query request 1580, API server 1502 may search a table metadata repository to identify a table metadata schema that corresponds to the logical table reference parameter 1506. Upon identifying the appropriate table metadata schema, a reflection-based query reconstruction module may generate a database-compatible query condition using the column metadata definitions contained in the metadata schema. The reconstructed condition may be used to construct a database query that resolves to one or more schema-conforming data records satisfying the filter parameter 1562.

Additionally, or alternatively, the constructed database query may retrieve schema-conforming data records from the database table 1511. A query response generator may encapsulate the retrieved records into a structured payload 1564 and return the structured payload 1564 to the client system in response to the query request 1580.

In some embodiments, the structured data processing system may also support export operations initiated by a query request. In such embodiments, a query request 1580 may include a retrieve mode that instructs API server 1510 to generate a structured data file 1508 based on one or more retrieved schema-conforming data records. API server 1510 may access the database table 1511, apply the logical table reference parameter 1506 to identify the corresponding table metadata schema, and reflect the metadata definitions including data value types, sizes, column descriptions, and validation criteria to convert the schema-conforming data records into a plurality of structured data entries.

As illustrated, the system may output a structured data file 1508 that reconstitutes the original format of the data based on the metadata-driven reconstruction process. The structured data file 1508 may include a header row derived from source column identifiers defined in the metadata schema and may contain values consistent with the schema constraints previously applied during ingestion. This metadata-based export process may enable round-trip data workflows and ensure that exported files remain consistent with governed table schemas.

In response to receiving the query request, a query processing module may identify a table metadata schema that corresponds to the logical table reference parameter. In one or more embodiments, the filter parameter may be expressed in a logical or abstract format (e.g., 1562, filter=eq ("ProbabilityOfDefault", "0.50")) and may include conditions related to values of source column headers known to the system through column metadata definitions. Filter parameter reconstruction module 1566 may apply a metadata-driven transformation process that converts the filter parameter into a database-compatible query condition (e.g., 1568) by resolving each referenced source column identifier to its associated database column name based on the metadata schema.

Figure 15K:
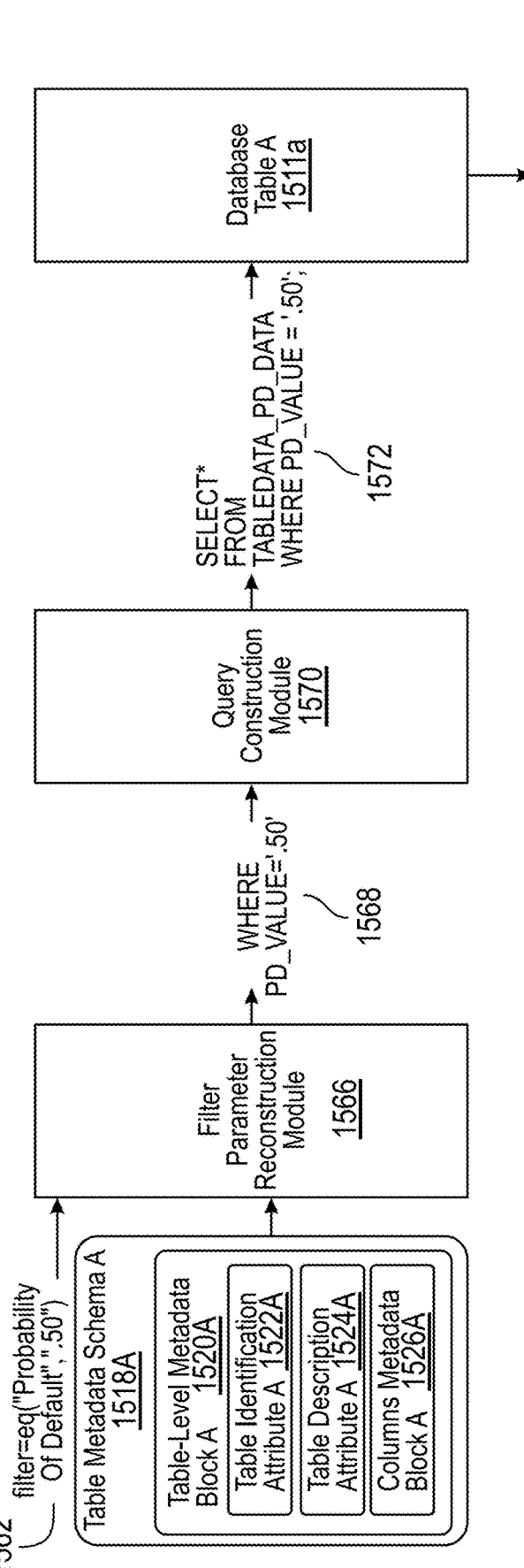
FIG. 15K illustrates an example process for receiving a column creation request and dynamically updating a table metadata schema with a new column metadata definition, according to some embodiments of the present technology.

In some embodiments, the database-compatible (e.g., reconstructed) query condition may be used by a query construction module 1570 to generate an executable database query (e.g., 1572), such as a structured query language (SQL) statement. As illustrated in FIG. 15K, an example query constructed using the database-compatible condition may include a SELECT clause and a WHERE clause with resolved column names (e.g., SELECT*FROM TABLE-DATA_PD_DATA WHERE PD_VALUE='50').

Upon executing the database query against the appropriate database table (e.g., table 1511A), the structured data processing system may retrieve a filtered set of schema-conforming data records. A query response generator may encapsulate the retrieved records in a response payload formatted for delivery to the requesting client system.

In some embodiments, the query request may specify a uniform resource locator (URL) endpoint, and the URL endpoint may include the logical table reference parameter and the filter parameter as query parameters. For example, a query request may be directed to an endpoint such as/risk-Market/tabledata?tableType=PD_DATA&filter-eq ("ProbabilityOfDefault", "0.50").

Additionally, or alternatively, operation 1440 implementing a structured data processing system may further include dynamically modifying a table metadata schema in response to a column creation request received via API server 1502. As illustrated in FIG. 15L, the column creation request 1572 may include one or more attributes specifying structural and semantic properties (e.g., 1572A-1572G) of a new database column to be added to a designated database table associated with a logical table reference parameter.

In some embodiments, upon receiving the column creation request, a column configuration module may initiate an update operation that includes adding the new database column to the physical structure of the database table and extending the table metadata schema to include a corresponding new column metadata definition. The new column metadata definition may be inserted into the columns metadata block of the table metadata schema associated with the logical table reference parameter.

Additionally, or alternatively, the column creation request may include an attribute specifying a column name for the new database column. In response, the new column metadata definition may include a column identification attribute that specifies the new database column name (e.g., 1572A). The column creation request may also include an attribute specifying a source column identifier (e.g., 1572B) for the new database column, and in response, the new column metadata definition may include a column description attribute (e.g., 1572C) that maps the source column identifier to the new database column. The column creation request may further include an attribute specifying a data type (e.g., 1572D) and data size (e.g., 1572E) for the new database column, and the new column metadata definition may include a column type attribute that converts the specified type and size into a database-compatible format. Additionally, the column creation request may include an attribute specifying a textual description or semantic annotation, and the new column metadata definition may include a column description attribute specifying the description (e.g., 1572F). The column creation request may also include an attribute specifying a validation criterion (e.g., 1572G) to be enforced for the new database column, and the column metadata definition may include a column description attribute encoding the specified criterion. The column creation request may further specify whether the new database column requires a value, and the column metadata definition may include a column description attribute indicating the required status.

In one or more embodiments, the modified table metadata schema may be persisted back to the table metadata repository and made immediately available for use in subsequent ingestion, validation, transformation, and query operations. Through the use of column creation requests and schema extensions, the structured data processing system may enable users or administrators to evolve or adapt table schemas post-deployment without requiring direct changes to application logic improving an adaptability and an extensibility of data table schema generation and management.

In some embodiments, in addition to upload processing, method 1400 implementing a structured data processing system may also execute data export operations that use and/or reflect the same metadata schema logic used during ingestion. In such embodiments, a data export request may be received via API server 1502, where the data export request includes the logical table reference parameter. In response, a metadata-driven export module may reconstruct the original data entry format from schema-conforming data records by using the column metadata definitions to resolve database column names back to source column headers. The structured data processing system may then return a second structured data file that associates each exported data entry with the appropriate source column headers that maintains logical table consistency and enables round-tripping or a bi-directional table schema formatting between file and database formats.

It should be noted that a computer-program product may include a non-transitory machine-readable storage medium storing computer instructions that, when executed by one or more operations, may perform operations corresponding to the processes and sub-processes of method 1400. Additionally, or alternatively, a computer-implemented method may include operations corresponding to processes and sub-processes of 1400. Additionally, or alternatively, a computer-implemented system may include one or more processors, a memory, and a computer-readable medium operably coupled to the one or more processors, the computer-readable medium having computer-readable instructions stored thereon that, when executed by the one or more processors, cause a computing device to perform operations corresponding to the processes and sub-processes of method 1400.

It shall also be noted that the system and methods of the embodiments and variations described herein can be embodied and/or implemented at least in part as a machine comprising a computer-readable medium storing computer-readable instructions. The instructions may be executed by computer-executable components integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, memory sticks (e.g., SD cards, USB flash drives), cloud-based services (e.g., cloud storage), magnetic storage devices, Solid-State Drives (SSDs), or any suitable device. The computer-executable component is preferably a general or application-specific processor, but any suitable dedicated hardware or hardware/firmware combination device can alternatively or additionally execute the instructions.

The systems and methods of the preferred embodiments may additionally, or alternatively, be implemented on an integrated data analytics software application and/or software architecture such as those offered by SAS Institute Inc. of Cary, N.C., USA. Merely for illustration, the systems and methods of the preferred embodiments may be implemented using or integrated with one or more SAS software tools such as SAS® Viya™ which is developed and provided by SAS Institute Inc. of Cary, N.C., USA.

Although omitted for conciseness, the preferred embodiments include every combination and permutation of the implementations of the systems and methods described herein.

As a person skilled in the art will recognize from the previous detailed description and from the figures and claims, modifications and changes can be made to the embodiments of the disclosure without departing from the scope of the various described embodiments. For example, aspects/operations of method 1400 may be interchanged, substituted, and/or added between this method.

We claim:

1. A computer-program product comprising a non-transitory machine-readable storage medium storing computer instructions that, when executed by one or more processors, perform operations comprising:

receiving, via an application programming interface (API) server, an upload request comprising a logical table reference parameter and a structured data file;

searching a table metadata repository for a table metadata schema corresponding to the logical table reference parameter, wherein a table description attribute of the table metadata schema specifies the logical table reference parameter;

converting a plurality of data entries of the structured data file into a plurality of schema-conforming data records using the table metadata schema, wherein converting the plurality of data entries into the plurality of schema-conforming data records includes:

extracting, from the table metadata schema, a plurality of column metadata definitions, identifying a plurality of source column headers of the structured data file that correspond to a plurality of source column identifiers specified in the plurality of column metadata definitions, parsing, from the plurality of data entries, a plurality of cell value sets associated with the plurality of source column headers, detecting a plurality of valid cell value sets from the plurality of cell value sets based on validation criteria defined in the plurality of column metadata definitions, and generating the plurality of schema-conforming data records by associating the plurality of valid cell value sets with a plurality of database columns that correspond to the plurality of source column identifiers in the plurality of column metadata definitions; and persisting the plurality of schema-conforming data records to a database table designated in the table metadata schema.

2. The computer-program product according to claim 1, wherein:

the table metadata schema corresponding to the logical table reference parameter includes a table-level metadata block, and the table-level metadata block includes:

a table identification attribute specifying the database table, the table description attribute comprising a metadata annotation that specifies the logical table reference parameter.

3. The computer-program product according to claim 1, wherein searching the table metadata repository for the table metadata schema corresponding to the logical table reference parameter includes:

detecting that a respective table metadata schema of the table metadata repository includes the table description attribute specifying the logical table reference parameter, and in response to the detecting, using the respective table metadata schema as the table metadata schema corresponding to the logical table reference parameter.

4. The computer-program product according to claim 1, wherein a respective column metadata definition of the plurality of column metadata definitions includes:

a column identification attribute specifying a respective database column of the plurality of database columns, a column description attribute comprising:

a metadata annotation that specifies a respective source column identifier of the plurality of source column identifiers, and the validation criteria for the respective database column a column type attribute that specifies a type of the respective database column, and a constraints attribute that specifies second validation criteria for the respective database column, different from the validation criteria included in the column description attribute.

5. The computer-program product according to claim 1, wherein identifying the plurality of source column headers corresponding to the plurality of source column identifiers specified in the plurality of column metadata definitions includes:

detecting a respective source column header in the structured data file, and identifying the respective source column header as one of the plurality of source column headers when a respective column metadata definition includes a source column identifier matching the respective source column header.

6. The computer-program product according to claim 1, wherein:

the upload request specifies a uniform resource locator (URL) endpoint and a payload, the URL endpoint includes the logical table reference parameter as a query parameter, and the payload includes the structured data file.

7. The computer-program product according to claim 1, wherein:

the logical table reference parameter is an alias of the database table designated in the table metadata schema, and the plurality of source column identifiers are aliases of the plurality of database columns.

8. The computer-program product according to claim 1, wherein:

the validation criteria defined in the plurality of column metadata definitions specifies first validation criteria for a first source column header of the plurality of source column headers, and detecting the plurality of valid cell value sets from the plurality of cell value sets includes:

determining that a value corresponding to the first source column header in a first cell value set of the plurality of cell value sets satisfies the first validation criteria, and in response to determining that the value corresponding to the first source column header in the first cell value set satisfies the first validation criteria, detecting the first cell value set as one of the plurality of valid cell value sets.

9. The computer-program product according to claim 8, wherein:

the validation criteria further specify second validation criteria for a second source column header of the plurality of source column headers, and detecting the plurality of valid cell value sets from the plurality of cell value sets further includes:

determining that a value corresponding to the second source column header in the first cell value set does not satisfy the second validation criteria, and in response to determining that the value corresponding to the first source column header in the first cell value set satisfies the first validation criteria and the value corresponding to the second source column header in the first cell value set does not satisfy the second validation criteria, forgoing detecting the first cell value set as one of the plurality of valid cell value sets.

10. The computer-program product according to claim 8, wherein the first validation criteria include one or more of:

a data type criterion that specifies a data type of the first source column header, a minimum value criterion that defines a lower value threshold for the first source column header, a maximum value criterion that defines an upper value threshold for the first source column header, a required criterion that specifies whether the first source column is required, and an enumerated value criterion that restricts values of the first source column header to a pre-defined set of values.

11. The computer-program product according to claim 1, wherein:

a respective data entry of the plurality of data entries includes a plurality of cells corresponding to the plurality of source column headers, and a respective cell value set of the plurality of cell value sets corresponds to the respective data entry and includes values of the plurality of cells corresponding to the plurality of source column headers.

12. The computer-program product according to claim 1, wherein parsing the plurality of cell value sets from the plurality of data entries includes:

parsing a first cell value set from a first data entry of the plurality of data entries, and parsing a second cell value set from a second data entry of the plurality of data entries.

13. The computer-program product according to claim 1, wherein:

a first valid cell value set of the plurality of valid cell value sets includes a respective value for a first source column header of the plurality of source column headers, and generating the plurality of schema-conforming data records includes:

determining that a first column metadata definition of the plurality of column metadata definitions includes a column identification attribute and a column description attribute that associates the first source column header with a first database column of the plurality of database columns, and generating a schema-conforming data record for the first valid cell value set by at least associating the respective value with the first database column.

14. The computer-program product according to claim 1, wherein the computer instructions, when executed by the one or more processors, perform operations further comprising:

receiving a query request comprising the logical table reference parameter and a filter parameter, and in response to receiving the query request:

returning a response to the query request that includes one or more of the plurality of schema-conforming data records in accordance with the filter parameter.

15. The computer-program product according to claim 14, wherein the computer instructions, when executed by the one or more processors, perform operations further comprising:

in response to receiving the query request:

reconstructing, via reflection of the table metadata schema, the filter parameter into a database-compatible query condition, constructing a database query that uses the database-compatible query condition, in response to executing the database query, receiving the one or more schema-conforming data records of the plurality of schema-conforming data records, and returning the response to the query request that includes the one or more schema-conforming data records.

16. The computer-program product according to claim 14, wherein:

the query request specifies a uniform resource locator (URL) endpoint, and the URL endpoint includes the filter parameter and the logical table reference parameter as a query parameter.

17. The computer-program product according to claim 1, wherein the computer instructions, when executed by the one or more processors, perform operations further comprising:

receiving, via the application programming interface server, a column creation request for the database table, and in response to receiving the column creation request:

adding a new database column to the database table, and adding, to the table metadata schema, a new column metadata definition corresponding to the new database column in accordance with the column creation request.

18. The computer-program product according to claim 17, wherein:

the column creation request includes an attribute specifying a name of the new database column, and the new column metadata definition added to the table metadata schema includes a column identification attribute specifying the name of the new database column.

19. The computer-program product according to claim 17, wherein:

the column creation request includes an attribute specifying a respective source column identifier associated with the new database column, and the new column metadata definition added to the table metadata schema includes a column description attribute specifying the respective source column identifier.

20. The computer-program product according to claim 17, wherein:

the column creation request includes an attribute specifying a data type associated with the new database column and an attribute specifying a data size associated with the new database column, and the new column metadata definition added to the table metadata schema includes a column type attribute that converts the data type and the data size to a database-compatible format.

21. The computer-program product according to claim 17, wherein:

the column creation request includes an attribute specifying a description for the new database column, and the new column metadata definition added to the table metadata schema includes a column description attribute specifying the description of the new database column.

22. The computer-program product according to claim 17, wherein:

the column creation request includes an attribute specifying a validation criterion for the new database column, and the new column metadata definition added to the table metadata schema includes a column description attribute specifying the validation criterion for the new database column.

23. The computer-program product according to claim 17, wherein:

the column creation request includes an attribute specifying whether the new database column requires a value, and the new column metadata definition added to the table metadata schema includes a column description attribute specifying whether the new database column requires the value.

24. The computer-program product according to claim 1, wherein the computer instructions, when executed by the one or more processors, perform operations further comprising:

after persisting the plurality of schema-conforming data records to the database table:

generating, in real-time, a response to the upload request indicating that the plurality of schema-conforming data records were successfully uploaded to the database table, and transmitting, in real-time, the response to a client device that initiated the upload request.

25. The computer-program product according to claim 1, wherein the computer instructions, when executed by the one or more processors, perform operations further comprising:

in response to persisting the plurality of schema-conforming data records to the database table:

broadcasting, to one or more software applications using the database table, a real-time message indicating that the plurality of schema-conforming data records were successfully uploaded to the database table.

26. The computer-program product according to claim 25, wherein the real-time message triggers an operation at the one or more software applications, including:

transmitting a notification to one or more users of the one or more software application, wherein the notification includes one or more of:

a summary of the plurality of schema-conforming data records uploaded to the database table, a link to access and review the plurality of schema-conforming data records uploaded to the database table, and an alert indicating required user action based on the plurality of schema-conforming data records uploaded to the database table.

27. The computer-program product according to claim 1, wherein:

the plurality of data entries of the structured data file are not compatible with the database table, and in response to receiving the upload request, the plurality of data entries are automatically converted into the plurality of schema-conforming data records to be compatible with the database table.

28. The computer-program product according to claim 1, wherein one or more computer-executable functions of the application programming interface server perform:

the searching of the table metadata repository, the converting of the plurality of data entries into the plurality of schema-conforming data records, and the persisting of the plurality of schema-conforming data records into the database table.

29. The computer-program product according to claim 28, wherein:

the one or more computer-executable functions are used to process the upload request, and the computer instructions, when executed by the one or more processors, perform operations further comprising:

receiving, via the application programming interface (API) server, a second upload request comprising a second logical table reference parameter, different from the first logical table reference parameter, and a second structured data file, different from the second structured data file, and re-invoking the one or more computer-executable functions to:

search the table metadata repository for a second table metadata schema corresponding to the second logical table reference parameter, convert a second plurality of data entries of the second structured data file into a second plurality of schema-conforming data records using the second table metadata schema, and persist the second plurality of schema-conforming data records to a second database table designated in the second table metadata schema.

30. The computer-program product according to claim 1, wherein the computer instructions, when executed by the one or more processors, perform operations further comprising:

receiving, via the application programming interface server, a data export request comprising the logical table reference parameter, and in response to receiving the data export request, converting, via reflection of the table metadata schema, the plurality of schema-conforming data records into the plurality of data entries, and returning a second structured data file that associates the plurality of data entries with the plurality of source column headers.

* * * * *